(12) United States Patent
Green et al.

(10) Patent No.: US 7,290,265 B2
(45) Date of Patent: Oct. 30, 2007

(54) EXPOSING J2C INTERFACE PROPERTIES

(75) Inventors: John Henry Green, Toronto (CA); Piotr Przybylski, Brooklin (CA)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 10/696,063

(22) Filed: Oct. 29, 2003

(65) Prior Publication Data

US 2005/0022205 A1 Jan. 27, 2005

(30) Foreign Application Priority Data

Jul. 25, 2003 (CA) .................................. 2436128

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................... 719/315; 709/245; 709/246

(58) Field of Classification Search ........ 719/310–320; 709/201, 217–219, 231–232, 245–246
See application file for complete search history.

(56) References Cited

U.S. PATENT DOCUMENTS

2003/0093471 A1* 5/2003 Upton ........................ 709/203
2003/0093575 A1* 5/2003 Upton ........................ 709/310
2004/0168128 A1* 8/2004 Friedman et al. ........... 715/530

OTHER PUBLICATIONS

JYACC, Inc, XMLInk: Integrating Enterprise Systems for e-business, Prolifics, 2001, pp. 1-10.*
Walrath, The J2EE Tutorial, obtained from Javas.sun.com, Dec. 2001, chapters "J2EE Connector Architecture","The Black Box Resource Adapters","Common Client Interface".*
Stearns, Using the J2EE Connector Architecture Common Client Interface, Apr. 2001, pp. 1-12.*
Jensen, Java Connector Architecture, Object Computing Inc, May 2002, pp. 1-10.*
The Apache, WSIFOperation_JCA, The Apache Software Foundation, 2002, pp. 1-10.*
*Enterprise Services,*—Fremantle, P. et al.; 2002.
*Composable Collaboration Infrastructures Based on Programming Patterns*—Roussev, V et al.; 2000.
*Rapidly Building Collaborative Applications by Direct Manipulation*—Banaver, G. et al.; 1998.

* cited by examiner

*Primary Examiner*—William Thomson
*Assistant Examiner*—Diem K Cao
(74) *Attorney, Agent, or Firm*—Martin J. McKinley; Dillon & Yudell LLP

(57) ABSTRACT

The invention relates to Web Services Invocation Framework (WSIF) operations. "interactionSpec" and "connectionSpec" are Java 2 Enterprise Edition Java Connector Architecture interfaces. Their properties are exposed as data in WSIF operations. Thus WSIF support for the Java 2 Enterprise Edition Java Connector Architecture is made functionally more complete.

3 Claims, 95 Drawing Sheets

```
/*
 * The Apache Software License, Version 1.1
 *
 * Copyright (c) 2002 The Apache Software Foundation.  All rights
 * reserved.
 *
 * Redistribution and use in source and binary forms, with or without
 * modification, are permitted provided that the following conditions
 * are met:
 *
 * 1. Redistributions of source code must retain the above copyright
 *    notice, this list of conditions and the following disclaimer.
 *
 * 2. Redistributions in binary form must reproduce the above copyright
 *    notice, this list of conditions and the following disclaimer in
 *    the documentation and/or other materials provided with the
 *    distribution.
 *
 * 3. The end-user documentation included with the redistribution,
 *    if any, must include the following acknowledgment:
 *       "This product includes software developed by the
 *        Apache Software Foundation (http://www.apache.org/)."
 *    Alternately, this acknowledgment may appear in the software itself,
 *    if and wherever such third-party acknowledgments normally appear.
 *
 * 4. The names "WSIF" and "Apache Software Foundation" must
 *    not be used to endorse or promote products derived from this
```

FIG.3A

```
 *    software without prior written permission. For written
 *    permission, please contact apache@apache.org.
 *
 * 5. Products derived from this software may not be called "Apache",
 *    nor may "Apache" appear in their name, without prior written
 *    permission of the Apache Software Foundation.
 *
 * THIS SOFTWARE IS PROVIDED ``AS IS'' AND ANY EXPRESSED OR IMPLIED
 * WARRANTIES, INCLUDING, BUT NOT LIMITED TO, THE IMPLIED WARRANTIES
 * OF MERCHANTABILITY AND FITNESS FOR A PARTICULAR PURPOSE ARE
 * DISCLAIMED.  IN NO EVENT SHALL THE APACHE SOFTWARE FOUNDATION OR
 * ITS CONTRIBUTORS BE LIABLE FOR ANY DIRECT, INDIRECT, INCIDENTAL,
 * SPECIAL, EXEMPLARY, OR CONSEQUENTIAL DAMAGES (INCLUDING, BUT NOT
 * LIMITED TO, PROCUREMENT OF SUBSTITUTE GOODS OR SERVICES; LOSS OF
 * USE, DATA, OR PROFITS; OR BUSINESS INTERRUPTION) HOWEVER CAUSED AND
 * ON ANY THEORY OF LIABILITY, WHETHER IN CONTRACT, STRICT LIABILITY,
 * OR TORT (INCLUDING NEGLIGENCE OR OTHERWISE) ARISING IN ANY WAY OUT
 * OF THE USE OF THIS SOFTWARE, EVEN IF ADVISED OF THE POSSIBILITY OF
 * SUCH DAMAGE.
 * ====================================================================
 *
 * This software consists of voluntary contributions made by many
 * individuals on behalf of the Apache Software Foundation and was
 * originally based on software copyright (c) 2001, 2002, International
 * Business Machines, Inc., http://www.apache.org.  For more
 * information on the Apache Software Foundation, please see
 * <http://www.apache.org/>.
 */
```

FIG. 3B

```
package org.apache.wsif.providers.jca;

import javax.resource.*;
import org.apache.wsif.logging.*;
import org.apache.wsif.providers.*;
import org.apache.wsif.*;
import org.apache.wsif.base.*;
import org.apache.wsif.util.*;
import javax.resource.*;
import javax.resource.cci.*;
import javax.wsdl.extensions.*;
import javax.wsdl.*;
import java.net.URL;
import java.util.*;
import javax.resource.cci.*;
import java.io.Serializable;
import java.util.*;

/**
 * The WSIFOperation_JCA class is an implementation of the WSIFOperation interface,
 * which is used to execute interactions with the EIS.
 *
 * @author Michael Beisiegel
 * @author Piotr Przybylski <piotrp@ca.ibm.com>
 * @author John Green
 */
public class WSIFOperation_JCA implements WSIFOperation {
```

FIG. 3C

```java
private static final long serialVersionUID = 1L;
protected Connection fieldConnection;
protected InteractionSpec fieldInteractionSpec;
protected Definition fieldDefinition;
protected Binding fieldBinding;
protected String fieldOperationName;
protected String fieldInputName;
protected String fieldOutputName;
protected Operation fieldOperation;
protected WSIFProviderJCAExtensions fieldFactory = null;
private final static String crlf = System.getProperty("line.separator");
private org.apache.wsif.providers.WSIFDynamicTypeMap fieldTypeMap;
private Port fieldPort;
private Service fieldService;
private WSIFPort_JCA fieldJcaPort;

/**
 * The WSIFOperation_JCA constructor.
 * @param aDefinition
 * @param aBinding
 * @param aOperationName
 * @param aInputName
 * @param aOutputName
 * @param aConnection
 * @param aInteractionSpec
 * @param aFactory
 * @param typeMap
 * @param aPort
```

FIG. 3D

```
 * @param aService
 * @param jcaPort
 */
public WSIFOperation_JCA(
    Definition aDefinition,
    Service aService,
    Port aPort,
    String aOperationName,
    String aInputName,
    String aOutputName,
    org.apache.wsif.providers.WSIFDynamicTypeMap typeMap,
    WSIFPort_JCA jcaPort,
    WSIFProviderJCAExtensions aFactory,
    Connection aConnection,
    InteractionSpec aInteractionSpec) { super();
    this.fieldDefinition = aDefinition;
    this.fieldInteractionSpec = aInteractionSpec;
    this.fieldConnection = aConnection;
    this.fieldFactory = aFactory;
    this.fieldBinding = aPort.getBinding();
    this.fieldOperationName = aOperationName;
    this.fieldInputName = aInputName;
    this.fieldOutputName = aOutputName;
    this.fieldTypeMap = typeMap;
    this.fieldPort = aPort;
    this.fieldService = aService;
```

FIG. 3E

```
        this.fieldJcaPort = jcaPort;
}

/**
 * Invokes the request/response operation. This method
 * <ul>
 * <li>Updates the InteractionSpec using data from the input message.
 * <li>If a Connection is not currently available creates one, where a
 * ConnectionSpec can be created using data from the input message and then
 * used when creating the Connection.
 * <li>Uses the Connection to create a javax.resource.cci.Interaction.
 * <li>Invokes the Interaction execute method.
 * <li>Closes the interaction.
 * <li>Updates the output message with InteractionSpec properties.
 * </ul>
 */
public boolean executeRequestResponseOperation(WSIFMessage input, WSIFMessage
output, WSIFMessage fault) throws WSIFException {

Trc.entry(this, input, output, fault);
    if (!input.getParts().hasNext())
        input = null;
    try {
        fieldFactory.updateInteractionSpec(input, fieldBinding,
fieldOperationName, fieldInputName, fieldOutputName, fieldInteractionSpec);
        if (this.fieldConnection == null){
            this.fieldConnection = this.fieldFactory.createConnection(input,
this.fieldDefinition, this.fieldService, this.fieldPort, this.fieldTypeMap,
```

FIG. 3F

```
this.fieldBinding, this.fieldOperationName, this.fieldInputName,
this.fieldOutputName);
            fieldJcaPort.setConnection(fieldConnection);
     }
     Interaction interaction = this.fieldConnection.createInteraction();
            interaction.execute(this.fieldInteractionSpec, (javax.resource.cci.Record)
input, (javax.resource.cci.Record) output);
     interaction.close();
     if (output instanceof WSIFMessage_JCA) {
            ((WSIFMessage_JCA)
output).setInteractionSpec(this.fieldInteractionSpec);
     }
     fieldFactory.updateOutputMessage(output, fieldBinding, fieldOperationName,
fieldInputName, fieldOutputName, fieldInteractionSpec);
  }
  catch (ResourceException exn1) {
     WSIFException newExn = new
WSIFException(WSIFResource_JCA.get("WSIF1000E"));
     newExn.setTargetException(exn1);
     Trc.exception(exn1);
     throw newExn;
  }
  catch (Throwable exn3) {
     WSIFException newExn = new WSIFException(WSIFResource_JCA.get("WSIF1008E",
exn3.getLocalizedMessage()));
     newExn.setTargetException(exn3);
     Trc.exception(newExn);
     throw newExn;
```

FIG. 3G

```
        }
        Trc.exit();
        return true;
    }

/**
 * Invokes input only operation. This method
 * <ul>
 * <li>Updates the InteractionSpec using data from the input message.
 * <li>If a Connection is not currently available creates one, where a
 * ConnectionSpec can be created using data from the input message and then
 * used when creating the Connection.
 * <li>Uses the Connection to create a javax.resource.cci.Interaction.
 * <li>Invokes the Interaction execute method.
 * <li>Closes the interaction.
 * </ul>
 */
public void executeInputOnlyOperation(WSIFMessage input) throws WSIFException {
    Trc.entry(this, input);
    if (!input.getParts().hasNext())
        input = null;
    try {
        fieldFactory.updateInteractionSpec(input, fieldBinding,
fieldOperationName, fieldInputName, fieldOutputName, fieldInteractionSpec);
        if (fieldConnection == null) {
            fieldConnection = this.fieldFactory.createConnection(input,
this.fieldDefinition, this.fieldService, this.fieldPort, this.fieldTypeMap,
```

FIG. 3H

```
this.fieldBinding, this.fieldOperationName, this.fieldInputName,
this.fieldOutputName);
            fieldJcaPort.setConnection(fieldConnection);
        }
        Interaction interaction = fieldConnection.createInteraction();
        interaction.execute(fieldInteractionSpec, (javax.resource.cci.Record)
input);
        interaction.close();
    }
    catch (ResourceException exn1) {
        WSIFException newExn = new
WSIFException(WSIFResource_JCA.get("WSIF1000E"));
        Trc.exception(exn1);
        newExn.setTargetException(exn1);
        throw newExn;
    }
    catch (Throwable exn3) {
        WSIFException newExn = new WSIFException(WSIFResource_JCA.get("WSIF1008E",
exn3.getLocalizedMessage()));
        newExn.setTargetException(exn3);
        Trc.exception(newExn);
        throw newExn;
    }
    Trc.exit();
}
/**
```

FIG. 3I

```
/*
 * This method creates the fault message. It first attempts to use Resource
 * Adapter specific class
 * to create the message. If this fails (i.e. the Resource Adapter does not
 * require specialized messages),
 * the method creates and returns <code>WSIFMessage_JCAStreamable</code> message.
 */
public WSIFMessage createFaultMessage() {

Trc.entry(this);
    WSIFMessage message =
this.fieldFactory.createFaultMessage(this.fieldDefinition, this.fieldBinding,
this.fieldOperationName, this.fieldInputName, this.fieldOutputName);
    if (message != null)
        return message;
    return new WSIFMessage_JCAStreamable(this.fieldDefinition, this.fieldBinding,
this.fieldOperationName, this.fieldInputName, this.fieldOutputName,
WSIFMessage_JCA.FAULT_MESSAGE);
}

/**
 * This method creates the fault message with specific name. It first attempts to
 * use Resource Adapter specific class
 * to create the message. If this fails (i.e. the Resource Adapter does not require
 * specialized messages),
 * the method creates and returns <code>WSIFMessage_JCAStreamable</code> message.
 */
public WSIFMessage createFaultMessage(String name) {
```

FIG. 3J

```
        Trc.entry(this, name);

WSIFMessage message =
this.fieldFactory.createFaultMessage(this.fieldDefinition, this.fieldBinding,
this.fieldOperationName, this.fieldInputName, this.fieldOutputName);
        if (message != null) {
            message.setName(name);
            return message;
        } message = new WSIFMessage_JCAStreamable(this.fieldDefinition,
this.fieldBinding, this.fieldOperationName, this.fieldInputName, this.fieldOutputName,
WSIFMessage_JCA.FAULT_MESSAGE);
        message.setName(name);
        return message;
    }

/**
     * This method creates the input message. It first attempts to use Resource
     * Adapter specific class
     * to create message. If this fails (i.e. the Resource Adapter does not require
     * specialized messages),
     * the method creates and returns <code>WSIFMessage_JCAStreamable</code> message.
     */
    public WSIFMessage createInputMessage() {

Trc.entry(this);
```

FIG. 3K

```
        WSIFMessage message =
this.fieldFactory.createInputMessage(this.fieldDefinition, this.fieldBinding,
this.fieldOperationName, this.fieldInputName, this.fieldOutputName);
        if (message != null)
            return message;
        return new WSIFMessage_JCAStreamable(this.fieldDefinition, this.fieldBinding,
this.fieldOperationName, this.fieldInputName, this.fieldOutputName,
WSIFMessage_JCA.INPUT_MESSAGE);
    }

/**
     * This method creates the input message with specific name. It first attempts to
     * use Resource Adapter specific class
     * to create message. If this fails (i.e. the Resource Adapter does not require
     * specialized messages),
     * the method creates and returns <code>WSIFMessage_JCAStreamable</code> message.
     */
    public WSIFMessage createInputMessage(String name) {
        Trc.entry(this, name);
        WSIFMessage message =
this.fieldFactory.createInputMessage(this.fieldDefinition, this.fieldBinding,
this.fieldOperationName, this.fieldInputName, this.fieldOutputName);
        if (message != null) {
            message.setName(name);
            return message;
        }
```

FIG. 3L

```
        message = new WSIFMessage_JCAStreamable(this.fieldDefinition,
this.fieldBinding, this.fieldOperationName, this.fieldInputName, this.fieldOutputName,
WSIFMessage_JCA.INPUT_MESSAGE);
        message.setName(name);
        return message;
    }

/**
     * This method creates the output message. It first attempts to use Resource
Adapter specific class
     * to create message. If this fails (i.e. the Resource Adapter does not require
specialized messages),
     * the method creates and returns <code>WSIFMessage_JCAStreamable</code> message.
     */
    public WSIFMessage createOutputMessage() {

Trc.entry(this);
        WSIFMessage message =
this.fieldFactory.createOutputMessage(this.fieldDefinition, this.fieldBinding,
this.fieldOperationName, this.fieldInputName, this.fieldOutputName);
        if (message != null)
            return message;
        return new WSIFMessage_JCAStreamable(this.fieldDefinition, this.fieldBinding,
this.fieldOperationName, this.fieldInputName, this.fieldOutputName,
WSIFMessage_JCA.OUTPUT_MESSAGE);
    }

```
/*
 * This method creates the output message with specific name. It first attempts to
 * use Resource Adapter specific class
 * to create message. If this fails (i.e. the Resource Adapter does not require
specialized messages),
 * the method creates and returns <code>WSIFMessage_JCAStreamable</code> message.
 */
public WSIFMessage createOutputMessage(String name) {

Trc.entry(this, name);
    WSIFMessage message =
this.fieldFactory.createOutputMessage(this.fieldDefinition, this.fieldBinding,
this.fieldOperationName, this.fieldInputName, this.fieldOutputName);
    if (message != null) {
        message.setName(name);
        return message;
    } message = new WSIFMessage_JCAStreamable(this.fieldDefinition,
this.fieldBinding, this.fieldOperationName, this.fieldInputName, this.fieldOutputName,
WSIFMessage_JCA.OUTPUT_MESSAGE);
    message.setName(name);
    return message;
}

/**
 * Returns the interactionSpec.
 * @return Returns a InteractionSpec
 */
public InteractionSpec getInteractionSpec() {
```

FIG. 3N

```
    return fieldInteractionSpec;
}

/**
 * Sets the interactionSpec.
 * @param interactionSpec The interactionSpec to set
 */
public void setInteractionSpec(InteractionSpec interactionSpec) {
    fieldInteractionSpec = interactionSpec;
} public String toString() {

StringBuffer buffer = new StringBuffer();
    buffer.append(crlf + "[JCAOperation" + crlf);
    try {
        if (fieldConnection != null)
            buffer.append("\tConnection: " + fieldConnection.toString() + crlf);
        else
            buffer.append("\tConnection: null" + crlf);

if (fieldInteractionSpec != null)
            buffer.append("\tInteractionSpec: " +
                    fieldInteractionSpec.toString() + crlf);
        else
            buffer.append("\tInteractionSpec: null" + crlf);

if (fieldBinding != null)
```

FIG. 30

```
    buffer.append("\tBinding:         " + fieldBinding.toString() + crlf);
else
    buffer.append("\tBinding:         null" + crlf);

if (fieldOperation != null)
    buffer.append("\tOperation:       " + fieldOperation.toString() + crlf);
else
    buffer.append("\tOperation:       null" + crlf);

if (fieldFactory != null)
    buffer.append("\tFactory:         " + fieldFactory.toString() + crlf);
else
    buffer.append("\tFactory:         null" + crlf);

if (fieldOperationName != null)
    buffer.append("\tOperationName:   " + fieldOperationName + crlf);
else
    buffer.append("\tOperationName:   null" + crlf);

if (fieldInputName != null)
    buffer.append("\tInputName:       " + fieldInputName + crlf);
else
    buffer.append("\tInputName:       null" + crlf);

if (fieldOutputName != null)
    buffer.append("\tOutputName:      " + fieldOutputName + crlf);
else
    buffer.append("\tOutputName:      null" + crlf);
```

FIG. 3P

```
        buffer.append("]" + crlf);
      }
      catch (Throwable exn) {
      }
      return buffer.toString();
  }

/**
   * Method not supported.
   */
  public WSIFCorrelationId executeRequestResponseAsync(WSIFMessage input,
WSIFResponseHandler handler) throws WSIFException {
      return null;
  }

/**
   * Method not supported.
   */
  public WSIFCorrelationId executeRequestResponseAsync(WSIFMessage input) throws
WSIFException {
      return null;
  }

/**
   * Method not supported.
   */
  public void fireAsyncResponse(Object response) throws WSIFException {
```

FIG. 3Q

```
}
/**
 * Method not supported.
 */
public boolean processAsyncResponse(Object response, WSIFMessage output,
WSIFMessage fault) throws WSIFException {
    return false;
}
/**
 * Method not supported.
 */
public void setContext(WSIFMessage context) {
}
/**
 * Method not supported.
 */
public WSIFMessage getContext() {
    return null;
}
}
```

FIG. 3R

```
//*****************************************************************
//  IBM Confidential
//  OCO Source Materials
//  <<PART NUMBER - 5724-B75>>
//  (C) Copyright IBM Corp. 2001 - All Rights Reserved.
//  US Government Users Restricted Rights - Use, duplication or disclosure
//  restricted by GSA ADP Schedule Contract with IBM Corp.
//
//*****************************************************************
package com.ibm.connector2.cics.tools;

import java.util.HashMap;
import java.util.Iterator;
import java.util.List;

import javax.naming.NamingException;
import javax.resource.ResourceException;
import javax.resource.cci.Connection;
import javax.resource.cci.ConnectionFactory;
import javax.resource.cci.ConnectionSpec;
import javax.resource.cci.InteractionSpec;
import javax.wsdl.*;
import javax.wsdl.extensions.ExtensibilityElement;

import com.ibm.connector2.cics.ECIConnectionSpec;
import com.ibm.connector2.cics.ECIInteractionSpec;
import com.ibm.connector2.cics.ECIManagedConnectionFactory;
```

FIG. 4A

```
import org.apache.wsif.*;
import org.apache.wsif.providers.WSIFDynamicTypeMap;
import org.apache.wsif.providers.jca.*;
import org.apache.wsif.spi.WSIFProvider;
import org.apache.wsif.base.*;

/**
 * A class specializing JCA classes for the ECI connector
 *
 */
public class WSIFProvider_ECI implements org.apache.wsif.spi.WSIFProvider,
org.apache.wsif.providers.jca.WSIFProviderJCAExtensions {
    private static final String copyright = "(c) Copyright IBM Corporation 2003.";
    static final long serialVersionUID = 1L;
    private final String[] namespaces = { ECIBindingConstants.NS_URI_ECI };
    private static final String CONNECTION_FACTORY_CLASS_NAME =
"javax.resource.cci.ConnectionFactory";

/**
     * WSIFDynamicProvider_ECI default constructor.
     */
    public WSIFProvider_ECI() {
        super();
        WSIFServiceImpl.addExtensionRegistry(new
com.ibm.connector2.cics.tools.ECIExtensionRegistry());
    }
    /**
```

FIG. 4B

```
/*
 * Creates a JCAOperation based on the specific WSDL defined operation.
 * Creating a JCAOperation involves creating an InteractionSpec and setting
 * its properties (based on the
 * extensibility element associated with the Operation). This InterationSpec
 * is then associated with the Connnection that was created as part of the JCA
 port.
 */
public WSIFOperation createOperation(Definition aDefinition, Service aService,
            Port aPort,
            String aOperationName, String aInputName,
            String aOutputName,
                            WSIFDynamicTypeMap typeMap, WSIFPort_JCA
jcaPort, Connection aConnection) {
    try {
        BindingOperation bindingOperation =
aPort.getBinding().getBindingOperation(aOperationName, aInputName, aOutputName);

if (bindingOperation == null) {
            throw new WSIFException(ECIResource.get("CTG9700E",aOperationName));
        }

ECIOperation cicsOperation = (ECIOperation) getExtElem(bindingOperation,
ECIOperation.class, bindingOperation.getExtensibilityElements());
        if (cicsOperation == null) {
            throw new
WSIFException(ECIResource.get("CTG9701E",bindingOperation));
        }
```

FIG. 4C

```
        com.ibm.connector2.cics.ECIInteractionSpec interactionSpec = new
com.ibm.connector2.cics.ECIInteractionSpec();
        try {
            if (cicsOperation.getFunctionName() != null)
                interactionSpec.setFunctionName(cicsOperation.getFunctionName());
            if (cicsOperation.getInteractionVerb() > -1)
                interactionSpec.setInteractionVerb(cicsOperation.getInteractionVerb());
            if (cicsOperation.getExecuteTimeout() > -1)
                interactionSpec.setExecuteTimeout(cicsOperation.getExecuteTimeout());
            if (cicsOperation.getCommareaLength() > -1)
                interactionSpec.setCommareaLength(cicsOperation.getCommareaLength());
            if (cicsOperation.getReplyLength() > -1)
                interactionSpec.setReplyLength(cicsOperation.getReplyLength());
        } catch (javax.resource.ResourceException exn) {
            throw new WSIFException(exn.getMessage());
        }

WSIFOperation_JCA jcaOperation = new WSIFOperation_JCA(aDefinition,
aService, aPort, aOperationName, aInputName, aOutputName, typeMap, jcaPort, this,
aConnection, interactionSpec);
        return jcaOperation;
    }
    catch (WSIFException exn) {
        exn.printStackTrace();
```

FIG. 4D

```
        }
        return null;
    }

// ----

/**
     * Utility method to retrieve extensibiliy element from list
     * checks also that it is exactly one extensibility element.
     */
    private Object getExtElem(Object ctx, Class extType, List extElems) throws
WSIFException {
        Object found = null;
        if (extElems != null) {
            for (Iterator i = extElems.iterator(); i.hasNext();) {
                // if so return new
                Object o = i.next();
                if (extType.isAssignableFrom(o.getClass())) {
                    if (found != null) {
                        throw new
WSIFException(ECIResource.get("CTG9702E",extType.getClass().getName(),ctx));
                    }
                    found = o;
                }
            }
        }
        return found;
    }
```

FIG. 4E

```
public WSIFMessage createInputMessage(Definition definition, Binding binding,
String operationName, String inputName, String outputName) {
    return null;
} public WSIFMessage createOutputMessage(Definition definition, Binding binding,
String operationName, String inputName, String outputName) {
    return null;
} public WSIFMessage createFaultMessage(Definition definition, Binding binding,
String operationName, String inputName, String outputName) {
    return null;
} public String[] getBindingNamespaceURIs() {
    return namespaces;
} public String[] getAddressNamespaceURIs() {
    return namespaces;
}

/**
 * Check if WSDL port has ECI binding and if successful try
 * to create JCA port instance.
 */
public org.apache.wsif.WSIFPort createDynamicWSIFPort(Definition definition,
Service service, Port port, org.apache.wsif.providers.WSIFDynamicTypeMap typeMap)
throws org.apache.wsif.WSIFException {
```

FIG. 4F

```
        org.apache.wsif.providers.jca.WSIFPort_JCA jcaPort = null;
        jcaPort = new org.apache.wsif.providers.jca.WSIFPort_JCA(definition, service,
port, null, this, typeMap);
        return jcaPort;
    }

/**
     * Update interactionSpec from input message values. Must be called
     * within execute methods, prior to processing the interaction.execute()
     * method. To change the default behaviour of doing nothing, the resource
     * should provide a class that extends this one, and overrides this method.
     */
    public void updateInteractionSpec(WSIFMessage input, Binding aBinding, String
aOperationName, String aInputName, String aOutputName, InteractionSpec
aInteractionSpec) throws org.apache.wsif.WSIFException {
        BindingOperation bindingOperation =
aBinding.getBindingOperation(aOperationName, aInputName, aOutputName);
        BindingInput bindingInput = bindingOperation.getBindingInput();
        if (bindingInput != null) {
            List list = bindingInput.getExtensibilityElements();
            Iterator inputIterator = list.iterator();
            while (inputIterator.hasNext()) {
                ExtensibilityElement ele = (ExtensibilityElement)
inputIterator.next();
                if (ele instanceof ECIInteractionSpecProperty) {
                    ECIInteractionSpecProperty prop = (ECIInteractionSpecProperty)
ele;
                    String ISName = prop.getPropertyName();
```

FIG. 4G

```
String partName = prop.getPartName();
if (ISName.equals(ECIBindingConstants.COMMAREA_LENGTH)) {
    Integer lengthObject = null;
    try {
        lengthObject = (Integer) input.getObjectPart(partName);
    } catch (Exception e) {
        throw new
WSIFException(ECIResource.get("CTG9704E",ECIBindingConstants.COMMAREA_LENGTH,e.getLoca
lizedMessage()));
    }
    if (lengthObject != null)
        ((ECIInteractionSpec)
aInteractionSpec).setCommareaLength(lengthObject.intValue());
    else
        throw new
WSIFException(ECIResource.get("CTG9703E",ECIBindingConstants.COMMAREA_LENGTH));
}
else if (ISName.equals(ECIBindingConstants.EXECUTE_TIMEOUT)) {
    Integer executionTimeout = null;
    try {
        executionTimeout = (Integer)
input.getObjectPart(partName);
    } catch (Exception e) {
        throw new
WSIFException(ECIResource.get("CTG9704E",ECIBindingConstants.EXECUTE_TIMEOUT,e.getLoca
lizedMessage()));
    }
    if (executionTimeout != null) {
```

FIG. 4H

```
        try {
            ((ECIInteractionSpec)
aInteractionSpec).setExecuteTimeout(executionTimeout.intValue());
        } catch (ResourceException re) {
            throw new
WSIFException(ECIResource.get("CTG9703E",ECIBindingConstants.EXECUTE_TIMEOUT));
        }
    } else
        throw new
WSIFException(ECIResource.get("CTG9703E",ECIBindingConstants.EXECUTE_TIMEOUT));
}
    else if (ISName.equals(ECIBindingConstants.FUNCTION_NAME)) {
        String functionName = null;
        try {
            functionName = (String) input.getObjectPart(partName);
        } catch (Exception e) {
            throw new
WSIFException(ECIResource.get("CTG9704E",ECIBindingConstants.FUNCTION_NAME,e.getLocali
zedMessage()));
        }
        if (functionName != null)
            ((ECIInteractionSpec)
aInteractionSpec).setFunctionName(functionName);
        else
            throw new
WSIFException(ECIResource.get("CTG9703E",ECIBindingConstants.FUNCTION_NAME));
    }
    else if (ISName.equals(ECIBindingConstants.INTERACTION_VERB)) {
```

FIG. 4I

```
            Integer interactionVerb = null;
            try {
                interactionVerb = (Integer)
input.getObjectPart(partName);
            } catch (Exception e) {
                throw new
WSIFException(ECIResource.get("CTG9704E",ECIBindingConstants.INTERACTION_VERB,e.getLoc
alizedMessage()));
            }
            if (interactionVerb != null) {
                try {
                    ((ECIInteractionSpec)
aInteractionSpec).setInteractionVerb(interactionVerb.intValue());
                } catch (ResourceException re) {
                    throw new
WSIFException(ECIResource.get("CTG9703E",ECIBindingConstants.INTERACTION_VERB));
                }
            } else
                throw new
WSIFException(ECIResource.get("CTG9703E",ECIBindingConstants.INTERACTION_VERB));
        } else if (ISName.equals(ECIBindingConstants.REPLY_LENGTH)) {
            Integer replyLength = null;
            try {
                replyLength = (Integer) input.getObjectPart(partName);
            }
            catch (Exception e) {
```

FIG. 4J

```
                        throw new
WSIFException(ECIResource.get("CTG9704E",ECIBindingConstants.REPLY_LENGTH,e.getLocaliz
edMessage()));
                   }
                   if (replyLength != null)
                        ((ECIInteractionSpec)
aInteractionSpec).setReplyLength(replyLength.intValue());
                   else
                        throw new
WSIFException(ECIResource.get("CTG9703E",ECIBindingConstants.REPLY_LENGTH));
              }
         }
    }

/**
     * Update output base on InteractionSpec values. Must be called
     * from within the execute methods, after processing the interaction.execute()
     * method. To change the default behaviour of doing nothing, the resource
     * should provide a class that extends this one, and overrides this method.
     */
    public void updateOutputMessage(WSIFMessage output, Binding aBinding, String
aOperationName, String aInputName, String aOutputName, InteractionSpec
aInteractionSpec) throws org.apache.wsif.WSIFException {
         // ECIInteractionSpec has no output properties.
         return;
    }
}
```

FIG. 4K

```java
public javax.resource.cci.Connection createConnection(WSIFMessage input,
Definition definition, Service service, Port port,
org.apache.wsif.providers.WSIFDynamicTypeMap typeMap, Binding aBinding, String
aOperationName, String aInputName, String aOutputName) throws
org.apache.wsif.WSIFException {

ECIConnectionSpec connectionSpec = null;
    Connection connection = null;
    ConnectionFactory connectionFactory = null;

Binding binding = port.getBinding();
    List eElements = binding.getExtensibilityElements();
    Iterator iterator = eElements.iterator();
    while (iterator.hasNext()) {
        Object o = iterator.next();
        if (o instanceof ECIBinding) {
            try {
                ExtensibilityElement portExtension = (ExtensibilityElement)
port.getExtensibilityElements().get(0);

if (portExtension == null) {
                    return connection;
                }

ECIAddress address = (ECIAddress) portExtension;

String res_ref_name = address.getJNDILookupName();
```

FIG. 4L

```
            if (res_ref_name != null) {
                connectionFactory =
WSIFUtils_JCA.lookupConnectionFactory(res_ref_name, CONNECTION_FACTORY_CLASS_NAME);
            }
            else {
                res_ref_name = WSIFUtils_JCA.getJNDILookupName(service,
port);
                if (res_ref_name != null) {
                    connectionFactory =
WSIFUtils_JCA.lookupConnectionFactory(res_ref_name, CONNECTION_FACTORY_CLASS_NAME);
                }
            }
            if (connectionFactory == null) {
                com.ibm.connector2.cics.ECIManagedConnectionFactory
managedConnectionFactory = new com.ibm.connector2.cics.ECIManagedConnectionFactory();
                if (address.getConnectionURL() != null)
managedConnectionFactory.setConnectionURL(address.getConnectionURL());
                    if (address.getConnectionURL() != null)
managedConnectionFactory.setServerName(address.getServerName());
                    if (address.getServerName() != null)
managedConnectionFactory.setClientSecurity(address.getClientSecurity());
                    if (address.getClientSecurity() != null)
managedConnectionFactory.setKeyRingClass(address.getKeyRingClass());
                    if (address.getKeyRingClass() != null)
```

FIG. 4M

```
            if (address.getKeyRingPassword() != null)
managedConnectionFactory.setKeyRingPassword(address.getKeyRingPassword());
            if (address.getPassword() != null)
managedConnectionFactory.setPassword(address.getPassword());
            if (address.getPortNumber() != null)
managedConnectionFactory.setPortNumber(address.getPortNumber());
            if (address.getServerSecurity() != null)
managedConnectionFactory.setServerSecurity(address.getServerSecurity());
            if (address.getUserName() != null)
managedConnectionFactory.setUserName(address.getUserName());
            if (address.getTPNName() != null)
managedConnectionFactory.setTPNName(address.getTPNName());
            if (address.getTranName() != null)
managedConnectionFactory.setTranName(address.getTranName());
        }
        connectionSpec =
            (ConnectionFactory)managedConnectionFactory.createConnectionFactory();
connectionFactory = (ConnectionFactory)
managedConnectionFactory.createConnectionFactory();
(ECIConnectionSpec)this.createConnectionSpec(input, aBinding, aOperationName,
aInputName, aOutputName);
```

FIG. 4N

```
            }
            catch (ResourceException e) {
                throw new WSIFException(e.getMessage(), e);
            }
        }
        try {
            if (connectionSpec == null)
                connection = connectionFactory.getConnection();
            else
                connection = connectionFactory.getConnection(connectionSpec);
        }
        catch (ResourceException exn2) {
            throw new WSIFException(exn2.getMessage(), exn2);
        }
        return connection;
    } private ConnectionSpec createConnectionSpec(WSIFMessage input, Binding aBinding,
String aOperationName, String aInputName, String aOutputName) throws WSIFException {

ECIConnectionSpec connectionSpec = null;
        BindingOperation bindingOperation =
aBinding.getBindingOperation(aOperationName, aInputName, aOutputName);
        BindingInput bindingInput = bindingOperation.getBindingInput();
```

FIG. 40

```java
if (bindingInput != null) {
    List list = bindingInput.getExtensibilityElements();
    Iterator inputIterator = list.iterator();
    while (inputIterator.hasNext()) {
        ExtensibilityElement ele = (ExtensibilityElement)
inputIterator.next();
        if (ele instanceof ECIConnectionSpecProperty) {
            ECIConnectionSpecProperty prop = (ECIConnectionSpecProperty) ele;
            String CSName = prop.getPropertyName();
            String partName = prop.getPartName();
            if (CSName.equals(ECIBindingConstants.USER_NAME)) {
                String userName = null;
                try {
                    userName = (String) input.getObjectPart(partName);
                } catch (Exception e) {
                    throw new
WSIFException(ECIResource.get("CTG9706E",ECIBindingConstants.USER_NAME,e.getLocalizedMessage()));
                }
                if (userName != null) {
                    if(connectionSpec == null) {
                        connectionSpec = new ECIConnectionSpec();
                        connectionSpec.setUserName(userName);
                    } else connectionSpec.setUserName(userName);
                } else
                    throw new
WSIFException(ECIResource.get("CTG9705E",ECIBindingConstants.USER_NAME));
```

FIG. 4P

```
        }
        else if (CSName.equals(ECIBindingConstants.PASSWORD)) {
            String password = null;
            try {
                password = (String) input.getObjectPart(partName);
            } catch (Exception e) {
                throw new
WSIFException(ECIResource.get("CTG9706E",ECIBindingConstants.PASSWORD,e.getLocalizedMe
ssage()));
            }
            if (password != null) {
                if(connectionSpec == null){
                    connectionSpec = new ECIConnectionSpec();
                    connectionSpec.setPassword(password);
                } else connectionSpec.setPassword(password);
            } else
                throw new
WSIFException(ECIResource.get("CTG9705E",ECIBindingConstants.PASSWORD));
        }
    }
    return connectionSpec;
}
```

FIG. 4Q

```
// ******************************************************************
// IBM Confidential
// OCO Source Materials
// <<PART NUMBER - 5724-B75>>
// (C) Copyright IBM Corp. 2001 - All Rights Reserved.
// US Government Users Restricted Rights - Use, duplication or disclosure
// restricted by GSA ADP Schedule Contract with IBM Corp.
// ******************************************************************
package com.ibm.connector2.cics.tools;

import java.io.Serializable;

import javax.xml.namespace.QName;
import javax.wsdl.extensions.ExtensibilityElement;

import org.apache.wsif.providers.jca.WSIFBindingOperation_JCAProperty;

/**
 * WSDL Eci Binding extension (interactionSpec).
 *
 */
public class ECIInteractionSpecProperty implements ExtensibilityElement,
WSIFBindingOperation_JCAProperty, Serializable {
    private static final String copyright = "(c) Copyright IBM Corporation 2003.";
    static final long serialVersionUID = 1L;
```

FIG. 5A

```
    protected QName fieldElementType =
ECIBindingConstants.Q_ELEM_ECI_INTERACTIONSPEC_PROPERTY;
    // Uses the wrapper type so we can tell if it was set or not.
    protected Boolean fieldRequired = null;

protected String fieldPartName;
    protected String fieldISName;

/**
     * Get the name of the part that contains the interactionSpec property
     */
    public String getPartName() {
        return fieldPartName;
    }

/**
     * Get the name of the interactionSpec property that is being stored
     */
    public String getPropertyName() {
        return fieldISName;
    }

/**
     * Set the name of the part that contains the interactionSpec property
     */
    public void setPartName(String rhs) {
        fieldPartName = rhs;
```

FIG. 5B

```
}
/**
 * Set the name of the interactionSpec property that is being stored
 */
public void setPropertyName(String rhs) {
    fieldISName = rhs;
}

/**
 * @see ExtensibilityElement#setElementType(QName)
 */
public void setElementType(QName elementType) {
    fieldElementType = elementType;
}

/**
 * @see ExtensibilityElement#getElementType()
 */
public QName getElementType() {
    return fieldElementType;
}

/**
 * @see ExtensibilityElement#setRequired(Boolean)
 */
public void setRequired(Boolean required) {
    fieldRequired = required;
}
```

FIG. 5C

```
/**
 * @see ExtensibilityElement#getRequired()
 */
public Boolean getRequired() {
    return fieldRequired;
} public String toString() {
    StringBuffer strBuf = new StringBuffer(super.toString());

strBuf.append("\nECIInteractionSpecProperty (" + fieldElementType + "):");
    strBuf.append("\nrequired=" + fieldRequired);

strBuf.append("\npart name=" + fieldPartName);
    strBuf.append("\ninteractionSpec property name=" + fieldISName);

return strBuf.toString();
}
```

FIG. 5D

```
//*************************************************************
// IBM Confidential
// OCO Source Materials
// <<PART NUMBER - 5724-B75>>
// (C) Copyright IBM Corp. 2003 - All Rights Reserved.
// US Government Users Restricted Rights - Use, duplication or disclosure
// restricted by GSA ADP Schedule Contract with IBM Corp.
//*************************************************************
package com.ibm.connector2.cics.tools;

import java.io.Serializable;

import javax.xml.namespace.QName;
import javax.wsdl.extensions.ExtensibilityElement;

import org.apache.wsif.providers.jca.WSIFBindingOperation_JCAProperty;

/**
 * WSDL Eci Binding extension (connectionSpec).
 *
 */
public class ECIConnectionSpecProperty implements ExtensibilityElement,
WSIFBindingOperation_JCAProperty, Serializable {
    private static final String copyright = "(c) Copyright IBM Corporation 2003.";
    static final long serialVersionUID = 1L;
```

FIG. 6A

```java
protected QName fieldElementType =
ECIBindingConstants.Q_ELEM_ECI_CONNECTIONSPEC_PROPERTY;
// Uses the wrapper type so we can tell if it was set or not.
protected Boolean fieldRequired = null;

protected String fieldPartName;
protected String fieldCSName;

/**
 * Get the name of the part that contains the connectionSpec property
 */
public String getPartName() {
    return fieldPartName;
}

/**
 * Get the name of the connectionSpec property that is being stored
 */
public String getPropertyName() {
    return fieldCSName;
}

/**
 * Set the name of the part that contains the connectionSpec property
 */
public void setPartName(String rhs) {
    fieldPartName = rhs;
```

FIG. 6B

```
}
/**
 * Set the name of the connectionSpec property that is being stored
 */
public void setPropertyName(String rhs) {
    fieldCSName = rhs;
}

/**
 * @see ExtensibilityElement#setElementType(QName)
 */
public void setElementType(QName elementType) {
    fieldElementType = elementType;
}

/**
 * @see ExtensibilityElement#getElementType()
 */
public QName getElementType() {
    return fieldElementType;
}

/**
 * @see ExtensibilityElement#setRequired(Boolean)
 */
public void setRequired(Boolean required) {
    fieldRequired = required;
}
```

FIG. 6C

```java
/**
 * @see ExtensibilityElement#getRequired()
 */
public Boolean getRequired() {
    return fieldRequired;
} public String toString() {
    StringBuffer strBuf = new StringBuffer(super.toString());

strBuf.append("\nECIConnectionSpecProperty (" + fieldElementType + "):");
    strBuf.append("\nrequired=" + fieldRequired);

strBuf.append("\npart name=" + fieldPartName);
    strBuf.append("\nconnectionSpec property name=" + fieldCSName);

return strBuf.toString();
}
```

FIG. 6D

```
/*
 * The Apache Software License, Version 1.1
 *
 * Copyright (c) 2002 The Apache Software Foundation.  All rights
 * reserved.
 *
 * Redistribution and use in source and binary forms, with or without
 * modification, are permitted provided that the following conditions
 * are met:
 *
 * 1. Redistributions of source code must retain the above copyright
 *    notice, this list of conditions and the following disclaimer.
 *
 * 2. Redistributions in binary form must reproduce the above copyright
 *    notice, this list of conditions and the following disclaimer in
 *    the documentation and/or other materials provided with the
 *    distribution.
 *
 * 3. The end-user documentation included with the redistribution,
 *    if any, must include the following acknowledgment:
 *       "This product includes software developed by the
 *        Apache Software Foundation (http://www.apache.org/)."
 *    Alternately, this acknowledgment may appear in the software itself,
 *    if and wherever such third-party acknowledgments normally appear.
 *
 * 4. The names "WSIF" and "Apache Software Foundation" must
 *    not be used to endorse or promote products derived from this
```

FIG. 7A

```
 *    software without prior written permission. For written
 *    permission, please contact apache@apache.org.
 *
 * 5. Products derived from this software may not be called "Apache",
 *    nor may "Apache" appear in their name, without prior written
 *    permission of the Apache Software Foundation.
 *
 * THIS SOFTWARE IS PROVIDED ``AS IS'' AND ANY EXPRESSED OR IMPLIED
 * WARRANTIES, INCLUDING, BUT NOT LIMITED TO, THE IMPLIED WARRANTIES
 * OF MERCHANTABILITY AND FITNESS FOR A PARTICULAR PURPOSE ARE
 * DISCLAIMED.  IN NO EVENT SHALL THE APACHE SOFTWARE FOUNDATION OR
 * ITS CONTRIBUTORS BE LIABLE FOR ANY DIRECT, INDIRECT, INCIDENTAL,
 * SPECIAL, EXEMPLARY, OR CONSEQUENTIAL DAMAGES (INCLUDING, BUT NOT
 * LIMITED TO, PROCUREMENT OF SUBSTITUTE GOODS OR SERVICES; LOSS OF
 * USE, DATA, OR PROFITS; OR BUSINESS INTERRUPTION) HOWEVER CAUSED AND
 * ON ANY THEORY OF LIABILITY, WHETHER IN CONTRACT, STRICT LIABILITY,
 * OR TORT (INCLUDING NEGLIGENCE OR OTHERWISE) ARISING IN ANY WAY OUT
 * OF THE USE OF THIS SOFTWARE, EVEN IF ADVISED OF THE POSSIBILITY OF
 * SUCH DAMAGE.
 * ====================================================================
 *
 * This software consists of voluntary contributions made by many
 * individuals on behalf of the Apache Software Foundation and was
 * originally based on software copyright (c) 2001, 2002, International
 * Business Machines, Inc., http://www.apache.org.  For more
 * information on the Apache Software Foundation, please see
 * <http://www.apache.org/>.
 */
```

FIG. 7B

```
package org.apache.wsif.providers.jca;

import javax.wsdl.*;
import javax.resource.cci.*;
import org.apache.wsif.*;
import org.apache.wsif.providers.WSIFDynamicTypeMap;

/**
 * This interface contains methods implemented by each Resource Adapter and used by
 * the Connector
 * Architecture provider to delegate Connector specific operations, for example
 * creation of the
 * WSIFOperation to the Resource Adapter.
 *
 * @author Michael Beisiegel
 * @author Piotr Przybylski <piotrp@ca.ibm.com>
 * @author John Green
 */
public interface WSIFProviderJCAExtensions {

/**
     * The provider for a resource adapter creates a WSIFOperation based on the
     * specified WSDL
     * operation. The binding operation extensibility element allows the resource
     * adapter to
```

FIG. 7C

```
 * populate its InteractionSpec to be used in the operation.
 *
 * @param definition
 * @param aService
 * @param aPort
 * @param operationName
 * @param inputName
 * @param outputName
 * @param typeMap
 * @param jcaPort
 * @param connection
 * @return WSIFOperation
 * @throws WSIFException
 */
public WSIFOperation createOperation(Definition definition, Service aService, Port
aPort, String operationName, String inputName, String outputName, WSIFDynamicTypeMap
typeMap, WSIFPort_JCA jcaPort, Connection connection) throws WSIFException;
/**
 * This method creates input message. It only needs to be implemented by Resource
Adapter which
 * uses custom format of the input and output records (i.e. does not use
javax.resource.cci.Streamable
 * interface).
 *
 * @param definition
 * @param binding
 * @param operationName
 * @param inputName
```

FIG. 7D

```
 * @param outputName
 * @return WSIFMessage
 */
public WSIFMessage createInputMessage(Definition definition, Binding binding,
String operationName, String inputName, String outputName);
/**
 * This method creates output message. It only needs to be implemented by Resource
Adapter which
 * uses custom format of the input and output records (i.e. does not use
javax.resource.cci.Streamable
 * interface).
 *
 * @param definition
 * @param binding
 * @param operationName
 * @param inputName
 * @param outputName
 * @return WSIFMessage
 */
public WSIFMessage createOutputMessage(Definition definition, Binding binding,
String operationName, String inputName, String outputName);
/**
 * This method creates a FaultMessage.
 *
 * @param definition
 * @param binding
 * @param operationName
 * @param inputName
```

FIG. 7E

```
 * @param outputName
 * @return WSIFMessage
 */
public WSIFMessage createFaultMessage(Definition definition, Binding binding,
String operationName, String inputName, String outputName);
/**
 * Updates the interactionSpec from input message values. The method is called
from
 * within the operation execute method, before invocation of Interaction.execute()
method
 * of the resource adapter.
 *
 * @param input
 * @param aBinding
 * @param aOperationName
 * @param aInputName
 * @param aOutputName
 * @param aInteractionSpec
 * @throws WSIFException
 */
public void updateInteractionSpec(WSIFMessage input, Binding aBinding, String
aOperationName, String aInputName, String aOutputName, InteractionSpec
aInteractionSpec) throws WSIFException;
/**
 * Updates the output message using output InteractionSpec values. This method is
called
 * from within the WSIFOperation execute method, after processing the
Interaction.execute() method
```

FIG. 7F

```
 * of the resource adapter..
 *
 * @param output Output message to populate
 * @param aBinding Bonding
 * @param aOperationName Operation name
 * @param aInputName Inpput name
 * @param aOutputName Output name
 * @param aInteractionSpec InteractionSpec after the execute() method invocation
 * @throws WSIFException
 */
public void updateOutputMessage(WSIFMessage output, Binding aBinding, String
aOperationName, String aInputName, String aOutputName, InteractionSpec
aInteractionSpec) throws WSIFException;

/**
 * Creates a javax.resource.cci.Connection.  This should be used when a resource
adapter supports
 * passing ConnectionSpec values as part of the input message.  WSIFOperation_JCA
will only call
 * this method during the execute method if the WSIFPort_JCA does not contain a
connection.
 *
 * @param input
 * @param definition
 * @param service
 * @param port
 * @param typeMap
 * @param aBinding
 * @param aOperationName
```

FIG. 7G

```
/**
 * @param aInputName
 * @param aOutputName
 * @return Connection
 * @throws WSIFException
 */
public Connection createConnection(WSIFMessage input, Definition definition,
Service service, Port port, org.apache.wsif.providers.WSIFDynamicTypeMap typeMap,
Binding aBinding, String aOperationName, String aInputName, String aOutputName) throws
WSIFException;
}
```

FIG. 7H

```
/*
 * The Apache Software License, Version 1.1
 *
 * Copyright (c) 2002 The Apache Software Foundation.  All rights
 * reserved.
 *
 * Redistribution and use in source and binary forms, with or without
 * modification, are permitted provided that the following conditions
 * are met:
 *
 * 1. Redistributions of source code must retain the above copyright
 *    notice, this list of conditions and the following disclaimer.
 *
 * 2. Redistributions in binary form must reproduce the above copyright
 *    notice, this list of conditions and the following disclaimer in
 *    the documentation and/or other materials provided with the
 *    distribution.
 *
 * 3. The end-user documentation included with the redistribution,
 *    if any, must include the following acknowledgment:
 *       "This product includes software developed by the
 *        Apache Software Foundation (http://www.apache.org/)."
 *    Alternately, this acknowledgment may appear in the software itself,
 *    if and wherever such third-party acknowledgments normally appear.
 *
 * 4. The names "WSIF" and "Apache Software Foundation" must
 *    not be used to endorse or promote products derived from this
```

FIG. 8A

```
 *  software without prior written permission. For written
 *  permission, please contact apache@apache.org.
 *
 * 5. Products derived from this software may not be called "Apache",
 *    nor may "Apache" appear in their name, without prior written
 *    permission of the Apache Software Foundation.
 *
 * THIS SOFTWARE IS PROVIDED ``AS IS'' AND ANY EXPRESSED OR IMPLIED
 * WARRANTIES, INCLUDING, BUT NOT LIMITED TO, THE IMPLIED WARRANTIES
 * OF MERCHANTABILITY AND FITNESS FOR A PARTICULAR PURPOSE ARE
 * DISCLAIMED.  IN NO EVENT SHALL THE APACHE SOFTWARE FOUNDATION OR
 * ITS CONTRIBUTORS BE LIABLE FOR ANY DIRECT, INDIRECT, INCIDENTAL,
 * SPECIAL, EXEMPLARY, OR CONSEQUENTIAL DAMAGES (INCLUDING, BUT NOT
 * LIMITED TO, PROCUREMENT OF SUBSTITUTE GOODS OR SERVICES; LOSS OF
 * USE, DATA, OR PROFITS; OR BUSINESS INTERRUPTION) HOWEVER CAUSED AND
 * ON ANY THEORY OF LIABILITY, WHETHER IN CONTRACT, STRICT LIABILITY,
 * OR TORT (INCLUDING NEGLIGENCE OR OTHERWISE) ARISING IN ANY WAY OUT
 * OF THE USE OF THIS SOFTWARE, EVEN IF ADVISED OF THE POSSIBILITY OF
 * SUCH DAMAGE.
 * ====================================================================
 *
 * This software consists of voluntary contributions made by many
 * individuals on behalf of the Apache Software Foundation and was
 * originally based on software copyright (c) 2001, 2002, International
 * Business Machines, Inc., http://www.apache.org.  For more
 * information on the Apache Software Foundation, please see
 * <http://www.apache.org/>.
 */
```

FIG. 8B

```
package org.apache.wsif.providers.jca;

import org.apache.wsif.*;
import org.apache.wsif.format.*;
import org.apache.wsif.providers.jca.WSIFUtils_JCA;
import org.apache.wsif.logging.*;
import java.net.MalformedURLException;
import java.net.URL;
import java.util.*;
import javax.wsdl.*;
import javax.wsdl.extensions.ExtensibilityElement;

/**
 * The class WSIFMessage_JCAStreamable is a specialized version of the WSIFMessage_JCA
 * to support Resource Adapters
 * using javax.resource.cci.Streamable.
 *
 * @author Michael Beisiegel
 * @author Piotr Przybylski <piotrp@ca.ibm.com>
 * @author John Green
 */
public class WSIFMessage_JCAStreamable extends
org.apache.wsif.providers.jca.WSIFMessage_JCA implements javax.resource.cci.Streamable
{
```

FIG. 8C

```java
    private static final long serialVersionUID = 1L;
    private Message fieldMessageModel = null;
    private java.util.HashMap fieldPartNameFormatHandlerMapping = new java.util.HashMap();

/**
     * @see org.apache.wsif.providers.jca.WSIFMessage_JCA#WSIFMessage_JCA(Definition, Binding, String, String, String, int)
     */
    public WSIFMessage_JCAStreamable(Definition aDefinition, Binding aBinding, String aOperationName, String aInputName, String aOutputName, int aMessageType) {
        super(aDefinition, aBinding, aOperationName, aInputName, aOutputName, aMessageType);
        Operation operation = aBinding.getPortType().getOperation(aOperationName, aInputName, aOutputName);
        switch(aMessageType){
            case WSIFMessage_JCA.INPUT_MESSAGE:
                if(operation.getInput() != null) {
                    this.fieldMessageModel = operation.getInput().getMessage();
                    setMessageDefinition(this.fieldMessageModel);
                }
                break;
            case WSIFMessage_JCA.OUTPUT_MESSAGE:
                if(operation.getOutput() != null) {
                    this.fieldMessageModel = operation.getOutput().getMessage();
                    setMessageDefinition(this.fieldMessageModel);
                }
                break;
```

FIG. 8D

```
        case WSIFMessage_JCA.FAULT_MESSAGE:
            break;
        default:
            // Assume input
            this.fieldMessageModel = operation.getInput().getMessage();
            setMessageDefinition(this.fieldMessageModel);
            break;
    }
}

/**
 * The method to read input stream and create message parts. For each part in the
message
 * (as defined in WSDL), with exception of parts representing ConnectionSpec and
InteractionSpec properties,
 * the format handler is created and its read() method is passed the inputStream.
The parts
 * creation is delayed until they are needed (i.e. when the client invokes
<code>getObjectPart</code>).
 * In this method only the part's format handler is created and stored.
 *
 * @see javax.resource.cci.Streamable#read(InputStream)
 */
public void read(java.io.InputStream inputStream) throws java.io.IOException {
    try {
        Trc.entry(this);
```

FIG. 8E

```
if(fieldMessageModel == null)
    return;
HashMap partsToNotProcess = new HashMap();
BindingOperation bindingOperation =
    fieldBinding.getBindingOperation(fieldOperationName, fieldInputName, fieldOutputName);
BindingOutput bindingOutput = bindingOperation.getBindingOutput();
if (bindingOutput != null) {
    List list = bindingOutput.getExtensibilityElements();
    Iterator inputIterator = list.iterator();
    while (inputIterator.hasNext()) {
        ExtensibilityElement ele =
            (ExtensibilityElement)inputIterator.next();
        if (ele instanceof WSIFBindingOperation_JCAProperty) {
            WSIFBindingOperation_JCAProperty prop =
                (WSIFBindingOperation_JCAProperty)ele;
            String partName = prop.getPartName();
            partsToNotProcess.put(partName,partName);
        }
    }
}
Iterator iterator =
    this.fieldMessageModel.getOrderedParts(null).iterator();
while (iterator.hasNext()) {
    Part part = (Part) iterator.next();
    String partName = part.getName();

if (partsToNotProcess.get(partName) != null) continue;
```

FIG. 8F

```
                WSIFFormatHandler_JCA formatHandler = null;
                if (this.fieldPartNameFormatHandlerMapping.containsKey(partName))
                    formatHandler =
                        (WSIFFormatHandler_JCA)
                            this.fieldPartNameFormatHandlerMapping.get(partName);
                else {
                    formatHandler = (WSIFFormatHandler_JCA)
                        WSIFUtils_JCA.getFormatHandler(part, this.fieldDefinition, this.fieldBinding);
                        this.fieldPartNameFormatHandlerMapping.put(partName,
                            formatHandler);
                }
                formatHandler.read(inputStream);
            }
            Trc.exit();
        }
        catch (Exception exn1) {
            Trc.exception(exn1);
            throw new java.io.IOException(WSIFResource_JCA.get("WSIF1004E",
                exn1.getLocalizedMessage()));
        }
    }

/**
     * Writes the contents of the message parts into the OutputStream. For each part
     * in the message
     * (as defined in WSDL), except parts representing interactionSpec properties, the
     * format handler
```

FIG. 8G

```
 * is created, part is set on the format handler and its <code>write</code> method
 is invoked.
 * The format handlers are stored in the table.
 *
 * @see javax.resource.cci.Streamable#write(OutputStream)
 */
public void write(java.io.OutputStream outputStream) throws java.io.IOException {
    try {
        Trc.entry(this);

HashMap partsToNotProcess = new HashMap();
        BindingOperation bindingOperation =
fieldBinding.getBindingOperation(fieldOperationName, fieldInputName, fieldOutputName);
        BindingInput bindingInput = bindingOperation.getBindingInput();
        if (bindingInput != null) {
            List list = bindingInput.getExtensibilityElements();
            Iterator inputIterator = list.iterator();
            while (inputIterator.hasNext()) {
                ExtensibilityElement ele = (ExtensibilityElement)
inputIterator.next();
                if (ele instanceof WSIFBindingOperation_JCAProperty) {
                    WSIFBindingOperation_JCAProperty prop =
(WSIFBindingOperation_JCAProperty) ele;
                    String partName = prop.getPartName();
                    partsToNotProcess.put(partName, partName);
                }
            }
        }
```

FIG. 8H

```
        }
        Iterator iterator = this.getPartNames();
        while (iterator.hasNext()) {
            String partName = (String) iterator.next();
            if (partsToNotProcess.get(partName) != null)
                continue;
            Object oPart = this.parts.get(partName);
            WSIFFormatHandler_JCA formatHandler = null;
            if (oPart instanceof WSIFFormatPart) {
                WSIFFormatPart jcaPart = (WSIFFormatPart) oPart;
                if (jcaPart._getFormatHandler() != null) {
                    formatHandler = (WSIFFormatHandler_JCA)
jcaPart._getFormatHandler();
                    this.fieldPartNameFormatHandlerMapping.put(partName,
formatHandler);
                }
            }
            if (formatHandler == null) {
                if (this.fieldPartNameFormatHandlerMapping.containsKey(partName))
                    formatHandler = (WSIFFormatHandler_JCA)
this.fieldPartNameFormatHandlerMapping.get(partName);
                else {
                    if (fieldMessageModel == null)
                        return;
                    Part part = (Part) this.fieldMessageModel.getPart(partName);
                    formatHandler = (WSIFFormatHandler_JCA)
WSIFUtils_JCA.getFormatHandler(part, this.fieldDefinition, this.fieldBinding);
```

FIG. 8I

```
                    this.fieldPartNameFormatHandlerMapping.put(partName,
formatHandler);
            }
            formatHandler.setObjectPart(oPart);
        }
        formatHandler.write(outputStream);
    }
    Trc.exit();
}
catch (Exception exn1) {
    Trc.exception(exn1);
    throw new java.io.IOException(WSIFResource_JCA.get("WSIF1005E",
exn1.getLocalizedMessage()));
    }
}

/**
 * Returns object part with the given name. If the part had already been created,
 * returns it. If there is a format handler for this part, the object part is
 obtained from
 * it and returned, otherwise it creates the format handler and returns
 * the object parts form it.
 *
 * @see org.apache.wsif.WSIFMessage#getObjectPart(String)
 */
public Object getObjectPart(String partName) {
```

FIG. 8J

```
Trc.entry(this, partName);

if(this.parts != null){
    Object existingPart = this.parts.get(partName);
    if (existingPart != null)
        return existingPart;
}
try {
    WSIFFormatHandler_JCA formatHandler =
        (WSIFFormatHandler_JCA)
this.fieldPartNameFormatHandlerMapping.get(partName);
    if (formatHandler != null) {
        if(this.fieldInteractionSpec != null)
            formatHandler.setInteractionSpec(this.fieldInteractionSpec);
        Object retPart = formatHandler.getObjectPart();
        this.setObjectPart(partName, retPart);
        Trc.exit(retPart);
        return retPart;
    }
    else {
        if(fieldMessageModel == null)
            return null;
        Part part = (Part) this.fieldMessageModel.getPart(partName);
        if (part == null) return null;
        formatHandler =
(WSIFFormatHandler_JCA)WSIFUtils_JCA.getFormatHandler(part, this.fieldDefinition,
this.fieldBinding);
```

FIG. 8K

```
        if(this.fieldInteractionSpec != null)
            formatHandler.setInteractionSpec(this.fieldInteractionSpec);
        Object retPart = formatHandler.getObjectPart();
        this.setObjectPart(partName, retPart);
        Trc.exit(retPart);
        return retPart;
    }
    catch (Exception exn) {
        Trc.exception(exn);
        throw new RuntimeException(WSIFResource_JCA.get("WSIF1007E",
exn.getLocalizedMessage()));
    }
}

/**
 * Returns object part with the given name and requested representation. If the
 * part had already
 * been created, it is returned. If there is a format handler for this part, it
 * gets the object part from the
 * format handler and returns it, otherwise the format handler is created and its
 * object part is returned.
 *
 * @see org.apache.wsif.WSIFMessage#getObjectPart(String)
 */
public Object getObjectPart(String partName, Class sourceClass) {
```

FIG. 8L

```
Trc.entry(this, partName, sourceClass);

try {
    if (this.parts != null) {
        Object existingPart = this.parts.get(partName);
        if (existingPart != null) {
            if (sourceClass.isAssignableFrom(existingPart.getClass())) {
                Trc.exit(existingPart);
                return existingPart;
            }
        }
    }
}
catch (Exception exn) {
    Trc.exception(exn);
} try {
    WSIFFormatHandler_JCA formatHandler = (WSIFFormatHandler_JCA)
this.fieldPartNameFormatHandlerMapping.get(partName);
    if (formatHandler != null) {
        if(this.fieldInteractionSpec != null)
            formatHandler.setInteractionSpec(this.fieldInteractionSpec);
        Object retSource = formatHandler.getObjectPart(sourceClass);
        this.setObjectPart(partName, retSource);
        Trc.exit(retSource);
        return retSource;
    }
}
```

FIG. 8M

```
        else {
            if(fieldMessageModel == null)
                return null;
            Part part = (Part) this.fieldMessageModel.getPart(partName);
            if (part == null) return null;
            formatHandler =
(WSIFFormatHandler_JCA)WSIFUtils_JCA.getFormatHandler(part, this.fieldDefinition,
this.fieldBinding);
            if(this.fieldInteractionSpec != null)
                formatHandler.setInteractionSpec(this.fieldInteractionSpec);
            Object retSource = formatHandler.getObjectPart(sourceClass);
            this.setObjectPart(partName, retSource);
            Trc.exit(retSource);
            return retSource;
        }
    }
    catch (Exception exn) {
        Trc.exception(exn);
        throw new RuntimeException(WSIFResource_JCA.get("WSIF1007E",
exn.getLocalizedMessage()));
    }
}

/**
 * @see org.apache.wsif.WSIFMessage#getPartNames()
 */
public Iterator getPartNames() {
```

FIG. 8N

```
try{
    if(this.fieldMessageModel == null)
        return null;
    return this.fieldMessageModel.getParts().keySet().iterator();
}
catch(Throwable exn){
    return null;
}
}

/**
 * @see org.apache.wsif.WSIFMessage#getParts()
 */
public Iterator getParts() {
try{
    Iterator partNames = this.getPartNames();
    while(partNames.hasNext()) {
        String nextName = (String)partNames.next();
        this.getObjectPart(nextName);
    }
    return(this.parts.values().iterator());
}
catch(Throwable exn){
    return null;
}
}
}
```

FIG. 80

```
/*
 * The Apache Software License, Version 1.1
 *
 * Copyright (c) 2002 The Apache Software Foundation.  All rights
 * reserved.
 *
 * Redistribution and use in source and binary forms, with or without
 * modification, are permitted provided that the following conditions
 * are met:
 *
 * 1. Redistributions of source code must retain the above copyright
 *    notice, this list of conditions and the following disclaimer.
 *
 * 2. Redistributions in binary form must reproduce the above copyright
 *    notice, this list of conditions and the following disclaimer in
 *    the documentation and/or other materials provided with the
 *    distribution.
 *
 * 3. The end-user documentation included with the redistribution,
 *    if any, must include the following acknowledgment:
 *       "This product includes software developed by the
 *        Apache Software Foundation (http://www.apache.org/)."
 *    Alternately, this acknowledgment may appear in the software itself,
 *    if and wherever such third-party acknowledgments normally appear.
 *
 * 4. The names "WSIF" and "Apache Software Foundation" must
 *    not be used to endorse or promote products derived from this
```

FIG. 9A

```
 *     software without prior written permission. For written
 *     permission, please contact apache@apache.org.
 *
 * 5. Products derived from this software may not be called "Apache",
 *    nor may "Apache" appear in their name, without prior written
 *    permission of the Apache Software Foundation.
 *
 * THIS SOFTWARE IS PROVIDED ``AS IS'' AND ANY EXPRESSED OR IMPLIED
 * WARRANTIES, INCLUDING, BUT NOT LIMITED TO, THE IMPLIED WARRANTIES
 * OF MERCHANTABILITY AND FITNESS FOR A PARTICULAR PURPOSE ARE
 * DISCLAIMED.  IN NO EVENT SHALL THE APACHE SOFTWARE FOUNDATION OR
 * ITS CONTRIBUTORS BE LIABLE FOR ANY DIRECT, INDIRECT, INCIDENTAL,
 * SPECIAL, EXEMPLARY, OR CONSEQUENTIAL DAMAGES (INCLUDING, BUT NOT
 * LIMITED TO, PROCUREMENT OF SUBSTITUTE GOODS OR SERVICES; LOSS OF
 * USE, DATA, OR PROFITS; OR BUSINESS INTERRUPTION) HOWEVER CAUSED AND
 * ON ANY THEORY OF LIABILITY, WHETHER IN CONTRACT, STRICT LIABILITY,
 * OR TORT (INCLUDING NEGLIGENCE OR OTHERWISE) ARISING IN ANY WAY OUT
 * OF THE USE OF THIS SOFTWARE, EVEN IF ADVISED OF THE POSSIBILITY OF
 * SUCH DAMAGE.
 * ====================================================================
 *
 * This software consists of voluntary contributions made by many
 * individuals on behalf of the Apache Software Foundation and was
 * originally based on software copyright (c) 2001, 2002, International
 * Business Machines, Inc., http://www.apache.org.  For more
 * information on the Apache Software Foundation, please see
 * <http://www.apache.org/>.
 */
```

FIG. 9B

```
package org.apache.wsif.providers.jca;

/**
 * An interface which is used to expose InteractionSpec or ConnectionSpec properties
 * as data at runtime by using parts in a message.
 * @author John Green
 */
public interface WSIFBindingOperation_JCAProperty {
    /**
     * Returns the name of the part which contains the InteractionSpec or
     ConnectionSpec property value.
     */
    public String getPartName();

/**
     * Returns the name of the InteractionSpec or ConnectionSpec property which is
     being stored.
     */
    public String getPropertyName();

/**
     * Sets the name of the part which contains the InteractionSpec or ConnectionSpec
     property value.
     */
    public void setPartName(String partName);
```

FIG. 9C

```
/**
 * Sets the name of the InteractionSpec or ConnectionSpec property which is being
stored.
 */
    public void setPropertyName(String propertyName);
}
```

FIG. 9D

```
<?xml version="1.0" encoding="UTF-8"?>
<definitions name="CustomerCICSECIServiceInterface"
targetNamespace="http://sample/"
xmlns="http://schemas.xmlsoap.org/wsdl/"
xmlns:cicseci="http://schemas.xmlsoap.org/wsdl/cicseci/"
xmlns:tns="http://sample/" xmlns:xsd="http://www.w3.org/2001/XMLSchema">
<types>
    <schema attributeFormDefault="qualified"
    elementFormDefault="unqualified" targetNamespace="http://sample/"
    xmlns="http://www.w3.org/2001/XMLSchema" xmlns:xsd1="http://sample/">
        <complexType name="Taderc99">
            <sequence>
                <element name="CustomerNumber">
                    <annotation>
                        <appinfo
                        source="http://www.wsadie.com/appinfo">
                            <initialValue kind="SPACE"></initialValue>
                        </appinfo>
                    </annotation>
                    <simpleType>
                        <restriction base="string">
                            <length value="5"></length>
                        </restriction>
                    </simpleType>
                </element>
                <element name="FirstName">
                    <annotation>
                        <appinfo
```

FIG. 10A

```
                source="http://www.wsadie.com/appinfo">
                <initialValue kind="SPACE"></initialValue>
            </appinfo>
        </annotation>
        <simpleType>
            <restriction base="string">
                <length value="15"></length>
            </restriction>
        </simpleType>
    </element>
    <element name="LastName">
        <annotation>
            <appinfo
                source="http://www.wsadie.com/appinfo">
                <initialValue kind="SPACE"></initialValue>
            </appinfo>
        </annotation>
        <simpleType>
            <restriction base="string">
                <length value="25"></length>
            </restriction>
        </simpleType>
    </element>
    <element name="Street">
        <annotation>
            <appinfo
                source="http://www.wsadie.com/appinfo">
                <initialValue kind="SPACE"></initialValue>
```

FIG. 10B

```
</appinfo>
</annotation>
</simpleType>
    <restriction base="string">
        <length value="20"></length>
    </restriction>
</simpleType>
</element>
<element name="City">
<annotation>
    <appinfo
        source="http://www.wsadie.com/appinfo">
        <initialValue kind="SPACE"></initialValue>
    </appinfo>
</annotation>
<simpleType>
    <restriction base="string">
        <length value="20"></length>
    </restriction>
</simpleType>
</element>
<element name="Country">
<annotation>
    <appinfo
        source="http://www.wsadie.com/appinfo">
        <initialValue kind="SPACE"></initialValue>
    </appinfo>
</annotation>
```

FIG. 10C

```
<simpleType>
    <restriction base="string">
        <length value="10"></length>
    </restriction>
</simpleType>
</element>
<element name="Phone">
    <annotation>
        <appinfo
         source="http://www.wsadie.com/appinfo">
            <initialValue kind="SPACE"></initialValue>
        </appinfo>
    </annotation>
    <simpleType>
        <restriction base="string">
            <length value="15"></length>
        </restriction>
    </simpleType>
</element>
<element name="PostalCode">
    <annotation>
        <appinfo
         source="http://www.wsadie.com/appinfo">
            <initialValue kind="SPACE"></initialValue>
        </appinfo>
    </annotation>
    <simpleType>
        <restriction base="string">
```

FIG. 10D

```
            <length value="7"></length>
          </restriction>
        </simpleType>
      </element>
    </sequence>
  </complexType>
</schema>
</types>
<message name="getCustomerRequest">
  <part name="taderc99" type="tns:Taderc99"></part>
  <part name="userid" type="xsd:string"></part>
  <part name="password" type="xsd:string"></part>
  <part name="functionName" type="xsd:string"></part>
</message>
<message name="getCustomerResponse">
  <part name="output" type="tns:Taderc99"></part>
</message>
<portType name="Customer">
  <operation name="getCustomer">
    <input name="getCustomerRequest" message="tns:getCustomerRequest"></input>
    <output name="getCustomerResponse"
            message="tns:getCustomerResponse"></output>
  </operation>
</portType>
</definitions>
```

FIG. 10E

```
<?xml version="1.0" encoding="UTF-8"?>
<definitions name="CustomerCICSECIBinding"
    targetNamespace="http://sample/"
    xmlns="http://schemas.xmlsoap.org/wsdl/"
    xmlns:cicseci="http://schemas.xmlsoap.org/wsdl/cicseci/"
    xmlns:format="http://schemas.xmlsoap.org/wsdl/formatbinding/"
    xmlns:phy="http://schemas.xmlsoap.org/wsdl/physicalrep/"
xmlns:tns="http://sample/">
    <import location="Customer.wsdl" namespace="http://sample/"/>
    <binding name="CustomerCICSECIBinding" type="tns:Customer">
        <cicseci:binding/>
        <phy:physicalformats name="CustomerCICSECIBinding">
            <xmi:XMI xmi:version="2.0"
                xmlns:TypeDescriptor="TypeDescriptor.xmi"
                xmlns:XSD="XSD.xmi" xmlns:physicalrep="physicalrep.xmi"
xmlns:xmi="http://www.omg.org/XMI">
                <physicalrep:TypeDescriptorMap
                    instanceTD="SimpleInstanceTD_1" xmi:id="TypeDescriptorMap_1">
                    <type
href="platform:/resource/Customer/sample/Customer.wsdl#XSDComponent:http://sample/:/Ta
derc99;XSDComplexTypeDefinition/XSDParticle/XSDModelGroup/XSDParticle=3/Street;XSDElem
entDeclaration/" xmi:type="XSD:XSDElementDeclaration"/>
                </physicalrep:TypeDescriptorMap>
                <TypeDescriptor:SimpleInstanceTD accessor="readWrite"
                    contentSize="20" offset="45"
                    platformInfo="PlatformCompilerInfo_1"
                    sharedType="StringTD_1" size="20" xmi:id="SimpleInstanceTD_1"/>
                <TypeDescriptor:PlatformCompilerInfo
```

FIG. 11A

```
                    defaultAddressSize="mode32" defaultBigEndian="false"
                    defaultCodepage="8859_1"
                    defaultExternalDecimalSign="ascii"
                    defaultFloatType="ieeeNonExtended" language="COBOL"
    xmi:id="PlatformCompilerInfo_1"/>
        <TypeDescriptor:StringTD addrUnit="word"
            alignment="byte" characterSize="1"
            lengthEncoding="fixedLength" paddingCharacter=" "
            prefixLength="0" width="20" xmi:id="StringTD_1"/>
    <physicalrep:TypeDescriptorMap
        instanceTD="SimpleInstanceTD_2" xmi:id="TypeDescriptorMap_2">
        <type
            href="platform:/resource/Customer/sample/Customer.wsdl#XSDComponent:http://sample/:/Ta
derc99;XSDComplexTypeDefinition/XSDParticle/XSDModelGroup/XSDParticle=1/FirstName;XSDE
lementDeclaration/" xmi:type="XSD:XSDElementDeclaration"/>
        </physicalrep:TypeDescriptorMap>
        <TypeDescriptor:SimpleInstanceTD accessor="readWrite"
            contentSize="15" offset="5"
            platformInfo="PlatformCompilerInfo_1"
            sharedType="StringTD_2" size="15" xmi:id="SimpleInstanceTD_2"/>
        <TypeDescriptor:PlatformCompilerInfo
            defaultAddressSize="mode32" defaultBigEndian="false"
            defaultCodepage="8859_1"
            defaultExternalDecimalSign="ascii"
            defaultFloatType="ieeeNonExtended" language="COBOL"
    xmi:id="PlatformCompilerInfo_1"/>
        <TypeDescriptor:StringTD addrUnit="byte"
```

FIG. 11B

```
              alignment="byte" characterSize="1"
              lengthEncoding="fixedLength" paddingCharacter=" "
              prefixLength="0" width="15" xmi:id="StringTD_2"/>
          <physicalrep:TypeDescriptorMap
              instanceTD="SimpleInstanceTD_3" xmi:id="TypeDescriptorMap_3">
              <type
href="platform:/resource/Customer/sample/Customer.wsdl#XSDComponent:http://sample/:/Ta
derc99;XSDComplexTypeDefinition/XSDParticle/XSDModelGroup/XSDParticle/CustomerNumber;X
SDElementDeclaration/" xmi:type="XSD:XSDElementDeclaration"/>
          </physicalrep:TypeDescriptorMap>
          <TypeDescriptor:SimpleInstanceTD accessor="readWrite"
              contentSize="5" offset="0"
              platformInfo="PlatformCompilerInfo_1"
              sharedType="StringTD_3" size="5" xmi:id="SimpleInstanceTD_3"/>
          <TypeDescriptor:PlatformCompilerInfo
              defaultAddressSize="mode32" defaultBigEndian="false"
              defaultCodepage="8859_1"
              defaultExternalDecimalSign="ascii"
              defaultFloatType="ieeeNonExtended" language="COBOL"
xmi:id="PlatformCompilerInfo_1"/>
          <TypeDescriptor:StringTD addrUnit="word"
              alignment="byte" characterSize="1"
              lengthEncoding="fixedLength" paddingCharacter=" "
              prefixLength="0" width="5" xmi:id="StringTD_3"/>
          <physicalrep:TypeDescriptorMap
              instanceTD="SimpleInstanceTD_4" xmi:id="TypeDescriptorMap_4">
              <type
```

FIG. 11C

```
href="platform:/resource/Customer/sample/Customer.wsdl#XSDComponent:http://sample/:/Ta
derc99;XSDComplexTypeDefinition/XSDParticle/XSDModelGroup/XSDParticle=2/LastName;XSDEl
ementDeclaration/" xmi:type="XSD:XSDElementDeclaration"/>
    </physicalrep:TypeDescriptorMap>
    <TypeDescriptor:SimpleInstanceTD accessor="readWrite"
        contentSize="25" offset="20"
        platformInfo="PlatformCompilerInfo_1"
        sharedType="StringTD_4" size="25" xmi:id="SimpleInstanceTD_4"/>
    <TypeDescriptor:PlatformCompilerInfo
        defaultAddressSize="mode32" defaultBigEndian="false"
        defaultCodepage="8859_1"
        defaultExternalDecimalSign="ascii"
        defaultFloatType="ieeeNonExtended" language="COBOL"
xmi:id="PlatformCompilerInfo_1"/>
    <TypeDescriptor:StringTD addrUnit="byte"
        alignment="byte" characterSize="1"
        lengthEncoding="fixedLength" paddingCharacter=" "
        prefixLength="0" width="25" xmi:id="StringTD_4"/>
    <physicalrep:TypeDescriptorMap
        instanceTD="SimpleInstanceTD_5" xmi:id="TypeDescriptorMap_5">
        <type
href="platform:/resource/Customer/sample/Customer.wsdl#XSDComponent:http://sample/:/Ta
derc99;XSDComplexTypeDefinition/XSDParticle/XSDModelGroup/XSDParticle=5/Country;XSDEle
mentDeclaration/" xmi:type="XSD:XSDElementDeclaration"/>
    </physicalrep:TypeDescriptorMap>
    <TypeDescriptor:SimpleInstanceTD accessor="readWrite"
```

FIG. 11D

```
    contentSize="10" offset="85"
    platformInfo="PlatformCompilerInfo_1"
    sharedType="StringTD_5" size="10" xmi:id="SimpleInstanceTD_5"/>
<TypeDescriptor:PlatformCompilerInfo
    defaultAddressSize="mode32" defaultBigEndian="false"
    defaultCodepage="8859_1"
    defaultExternalDecimalSign="ascii"
    defaultFloatType="ieeeNonExtended" language="COBOL"
    xmi:id="PlatformCompilerInfo_1"/>
<TypeDescriptor:StringTD addrUnit="byte"
    alignment="byte" characterSize="1"
    lengthEncoding="fixedLength" paddingCharacter=" "
    prefixLength="0" width="10" xmi:id="StringTD_5"/>
<physicalrep:TypeDescriptorMap
    instanceTD="SimpleInstanceTD_6" xmi:id="TypeDescriptorMap_6">
  <type
    href="platform:/resource/Customer/sample/Customer.wsdl#XSDComponent:http://sample/:/Taderc99;XSDComplexTypeDefinition/XSDParticle/XSDModelGroup/XSDParticle=4/City:XSDElementDeclaration/" xmi:type="XSD:XSDElementDeclaration"/>
</physicalrep:TypeDescriptorMap>
<TypeDescriptor:SimpleInstanceTD accessor="readWrite"
    contentSize="20" offset="65"
    platformInfo="PlatformCompilerInfo_1"
    sharedType="StringTD_6" size="20" xmi:id="SimpleInstanceTD_6"/>
<TypeDescriptor:PlatformCompilerInfo
    defaultAddressSize="mode32" defaultBigEndian="false"
    defaultCodepage="8859_1"
```

FIG. 11E

```
            defaultExternalDecimalSign="ascii"
            defaultFloatType="ieeeNonExtended" language="COBOL"
  xmi:id="PlatformCompilerInfo_1"/>
        <TypeDescriptor:StringTD addrUnit="byte"
            alignment="byte" characterSize="1"
            lengthEncoding="fixedLength" paddingCharacter=" "
            prefixLength="0" width="20" xmi:id="StringTD_6"/>
        <physicalrep:TypeDescriptorMap
            instanceTD="AggregateInstanceTD_1" xmi:id="TypeDescriptorMap_7">
          <type
href="platform:/resource/Customer/sample/Customer.wsdl#XSDComponent:http://sample/:/Ta
derc99;XSDComplexTypeDefinition/" xmi:type="XSD:XSDComplexTypeDefinition"/>
        </physicalrep:TypeDescriptorMap>
        <TypeDescriptor:AggregateInstanceTD accessor="readWrite"
            contentSize="117" offset="0"
            platformInfo="PlatformCompilerInfo_1" size="117"
  xmi:id="AggregateInstanceTD_1">
          <TypeDescriptor:PlatformCompilerInfo
            defaultAddressSize="mode32" defaultBigEndian="false"
            defaultCodepage="8859_1"
            defaultExternalDecimalSign="ascii"
            defaultFloatType="ieeeNonExtended" language="COBOL"
  xmi:id="PlatformCompilerInfo_1"/>
        <physicalrep:TypeDescriptorMap
            instanceTD="SimpleInstanceTD_7" xmi:id="TypeDescriptorMap_8">
          <type
```

FIG. 11F

```
href="platform:/resource/Customer/sample/Customer.wsdl#XSDComponent:http://sample/:/Ta
derc99;XSDComplexTypeDefinition/XSDParticle/XSDModelGroup/XSDParticle=6/Phone;XSDEleme
ntDeclaration/" xmi:type="XSD:XSDElementDeclaration"/>
        </physicalrep:TypeDescriptorMap>
        <TypeDescriptor:SimpleInstanceTD accessor="readWrite"
            contentSize="15" offset="95"
            platformInfo="PlatformCompilerInfo_1"
            sharedType="StringTD_7" size="15" xmi:id="SimpleInstanceTD_7"/>
        <TypeDescriptor:PlatformCompilerInfo
            defaultAddressSize="mode32" defaultBigEndian="false"
            defaultCodepage="8859_1"
            defaultExternalDecimalSign="ascii"
            defaultFloatType="ieeeNonExtended" language="COBOL"
xmi:id="PlatformCompilerInfo_1"/>
        <TypeDescriptor:StringTD addrUnit="word"
            alignment="byte" characterSize="1"
            lengthEncoding="fixedLength" paddingCharacter=" "
            prefixLength="0" width="15" xmi:id="StringTD_7"/>
        <physicalrep:TypeDescriptorMap
            instanceTD="SimpleInstanceTD_8" xmi:id="TypeDescriptorMap_9">
            <type
href="platform:/resource/Customer/sample/Customer.wsdl#XSDComponent:http://sample/:/Ta
derc99;XSDComplexTypeDefinition/XSDParticle/XSDModelGroup/XSDParticle=7/PostalCode;XSD
ElementDeclaration/" xmi:type="XSD:XSDElementDeclaration"/>
        </physicalrep:TypeDescriptorMap>
```

FIG. 11G

```xml
<TypeDescriptor:SimpleInstanceTD accessor="readWrite"
    contentSize="7" offset="110"
    platformInfo="PlatformCompilerInfo_1"
    sharedType="StringTD_8" size="7" xmi:id="SimpleInstanceTD_8"/>
<TypeDescriptor:PlatformCompilerInfo
    defaultAddressSize="mode32" defaultBigEndian="false"
    defaultCodepage="8859_1"
    defaultExternalDecimalSign="ascii"
    defaultFloatType="ieeeNonExtended" language="COBOL"
    xmi:id="PlatformCompilerInfo_1"/>
<TypeDescriptor:StringTD addrUnit="word"
    alignment="byte" characterSize="1"
    lengthEncoding="fixedLength" paddingCharacter=" "
    prefixLength="0" width="7" xmi:id="StringTD_8"/>
    </xmi:XMI>
</phy:physicalformats>
<format:typeMapping encoding="ibmcobol">
    <format:typeMap formatType="CustomerCICSECIBinding"
typeName="tns:Taderc99"/>
</format:typeMapping>
<operation name="getCustomer">
    <cicseci:operation interactionVerb="-1"/>
    <input name="getCustomerRequest">
    <cicseci:connectionSpecProperty part="userid"
        propertyName="userName"
required="false"></cicseci:connectionSpecProperty>
    <cicseci:connectionSpecProperty part="password"
```

FIG. 11H

```
              propertyName="password"
required="false"></cicseci:connectionSpecProperty>
              <cicseci:interactionSpecProperty part="functionName"
              propertyName="functionName"></cicseci:interactionSpecProperty>
            </input>
            <output name="getCustomerResponse"/>
          </operation>
        </binding>
</definitions>
```

FIG. 11I

```
<?xml version="1.0" encoding="UTF-8"?>
<definitions name="CustomerCICSECIService"
targetNamespace="http://sample/"
xmlns="http://schemas.xmlsoap.org/wsdl/"
xmlns:cicseci="http://schemas.xmlsoap.org/wsdl/cicseci/"
xmlns:tns="http://sample/">
    <import location="Customer.wsdl" namespace="http://sample/"/>
    <import location="CustomerCICSECIBinding.wsdl" namespace="http://sample/"/>
    <service name="CustomerCICSECIService">
        <port binding="tns:CustomerCICSECIBinding" name="CustomerCICSECIPort">
            <cicseci:address connectionURL="exam.ple1.com" serverName="example1"/>
        </port>
    </service>
</definitions>
```

FIG. 12

```
package sample;
import org.apache.wsif.*;
import org.apache.wsif.base.*;
import javax.xml.namespace.QName;
/**
 * CustomerProxy
 * Generated code. Only edit user code sections.
 * @generated
 */
public class CustomerProxy {
    /**
     * @generated
     */
    private static final int INPUT_ONLY = 0;
    /**
     * @generated
     */
    private static final int REQUEST_RESPONSE = 1;
    /**
     * @generated
     */
    private WSIFPort fieldPort;
    /**
     * @generated
     */
    private WSIFService fieldService;
    /**
     * @generated
```

FIG. 13A

```
    */
    private static WSIFService fieldStaticService = null;
    /**
     * getPort
     * @generated
     */
    public WSIFPort getPort() {
        return fieldPort;
    }
    /**
     * setPort
     * @generated
     */
    public void setPort(WSIFPort newPort) {
        fieldPort = newPort;
    }
    /**
     * getService
     * @generated
     */
    public WSIFService getService() {
        return fieldService;
    }
    /**
     * setService
     * @generated
     */
    public void setService(WSIFService newService) {
```

FIG. 13B

```
    fieldService = newService;
}
/**
 * getCustomer
 * @generated
 */
public sample.Taderc99 getCustomer(
    sample.Taderc99 argTaderc99,
    java.lang.String argUserid,
    java.lang.String argPassword,
    java.lang.String argFunctionName)
    throws org.apache.wsif.WSIFException { try {

// user code begin {pre_execution}
        // user code end

WSIFDefaultMessage inputMessage = new WSIFDefaultMessage();
        inputMessage.setObjectPart("taderc99", argTaderc99);
        inputMessage.setObjectPart("userid", argUserid);
        inputMessage.setObjectPart("password", argPassword);
        inputMessage.setObjectPart("functionName", argFunctionName);

WSIFMessage outputMessage = execute("getCustomer", "getCustomerRequest",
"getCustomerResponse", inputMessage, REQUEST_RESPONSE);

// user code begin {post_execution}
```

FIG. 13C

```
        // user code end return (sample.Taderc99) outputMessage.getObjectPart("output");

} catch (Exception e) {
        // user code begin {exception_handling}
        // user code end
        if (e instanceof org.apache.wsif.WSIFException)
            throw (org.apache.wsif.WSIFException) e;
        throw new org.apache.wsif.WSIFException(e.getMessage(), e);
    }
}
/**
 * constructor
 * @generated
 */
public CustomerProxy() throws WSIFException {

// user code begin {custom_initialization}
    // user code end if (this.fieldStaticService == null) { this.fieldStaticService =
            WSIFServiceFactory.newInstance().getService(
                "sample/CustomerCICSECIService.wsdl",
                this.getClass().getClassLoader(),
                "http://sample/",
```

FIG. 13D

```
            "CustomerCICSECIService",
            "http://sample/",
            "Customer");
    };

if (this.fieldStaticService == null)
        return;

this.fieldStaticService.mapType(new QName("http://sample/", "Taderc99"),
sample.Taderc99.class);

// user code begin {port_factory_setup}
    // user code end

}
/**
 * main method (for proxy unit testing)
 * @generated
 */
public static void main(String[] args) {
    try {

CustomerProxy aProxy = new CustomerProxy();

// user code begin {proxy_method_calls}
        Taderc99 record = new Taderc99();
        record = aProxy.getCustomer(record,"sysad","sysad","TADERC99");
        System.out.println(record.getFirstName());
```

FIG. 13E

```
        // user code end
    } catch (Exception e) {
        // user code begin {exception_handling}
        e.printStackTrace();
        // user code end
    }
}
/**
 * execute (base message-level execution)
 * @generated
 */
public WSIFMessage execute(String operationName, String inputName, String outputName, WSIFMessage aMessage, int operationType)
    throws WSIFException, Exception {

WSIFPort port;
    if (this.fieldPort == null) {
        if (this.fieldService == null)
            this.fieldService = fieldStaticService;
        if (this.fieldService == null)
            throw new WSIFException("Failed to resolve WSIFService.");
        port = this.fieldService.getPort("CustomerCICSECIPort");
    } else {
        port = this.fieldPort;
    }
```

FIG. 13F

```java
    WSIFOperation operation = port.createOperation(operationName, inputName,
outputName);

WSIFMessage inputMessage = operation.createInputMessage();

String partName;
    java.util.Iterator iterator = aMessage.getPartNames();
    while (iterator.hasNext()) {
        partName = (String) iterator.next();
        inputMessage.setObjectPart(partName, aMessage.getObjectPart(partName));
    }

WSIFMessage outputMessage = operation.createOutputMessage();
    WSIFMessage faultMessage = operation.createFaultMessage();
    boolean success = true;
    if (operationType == INPUT_ONLY)
        operation.executeInputOnlyOperation(inputMessage);
    else if (operationType == REQUEST_RESPONSE)
        success = operation.executeRequestResponseOperation(inputMessage,
outputMessage, faultMessage);

if (this.fieldPort == null)
        port.close();

if (!success) {
        java.util.Iterator i = faultMessage.getParts();
        if (i.hasNext()) {
            Object part = i.next();
```

FIG. 13G

```
            if (part instanceof Exception)
                throw (Exception) part;
            else
                throw new WSIFException(String.valueOf(part));
        }
        return outputMessage;
    }
}
```

FIG. 13H

EXPOSING J2C INTERFACE PROPERTIES

COPYRIGHT NOTICE

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright whatsoever.

BACKGROUND OF THE INVENTION

1. Field of the Invention

The present invention relates to Web Services Invocation Framework (WSIF) operations and, in particular, to exposing J2C interface properties in such operations.

2. Description of the Related Art

Historically, Enterprise Information/integration Systems (EIS), such as legacy mainframe systems, and, more recently, commercial applications, have been at the center of modern information technology environments, providing critical data for enterprise operations. Companies have big investments in their Enterprise Information Systems. While many applications may be old, some may be new. The EIS provides the company with the quality of service required by the company. An example application, known as a "transactional" application, allows updates to be made to a bank account. Although these systems continue to be critically important to many businesses, these businesses may further rely on other applications. As these other applications are often web or wireless applications, there appears to be an increasing need to integrate web and wireless applications with legacy mainframe systems and existing commercial applications. Such integration requires the real-time exchange of information and services by a range of interested parties. The new applications, for which this integration is required, are increasingly being developed in the Java™ programming language.

As a required element of the Java™ 2 Enterprise Edition (J2EE), the Java ConnectorArchitecture (J2C) provides a standardized means to integrate Java applications with EISs (Java is a Trademark of Sun Microsystems, Inc.) J2C defines a Common Client Interface (CCI). The CCI defines a standard client Application Programming Interface (API) for application components. The CCI enables application components and Enterprise Application Integration (EAI) frameworks to drive interactions across heterogeneous EISs using a common client API. Interfaces that are part of the CCI include "interactionSpec" and "connectionSpec"; these interfaces are further described hereinafter.

As mentioned hereinbefore, companies may have business requirements to enable web access to these services. To extend the previous example of a banking application, there may be a requirement to enable access to bank accounts over the Internet. The J2EE Connector architecture (J2C) provides an environment so that an EIS can provide a resource adapter that can plug in to any application server so that the application server can generically provide qualities of service to all resource adapters, and optionally, through the CCI, the resource adapter can implement the common client programming model for the enterprise application. Such J2C services may further be extended to be web services.

Integration of Java applications with EIS may be accomplished through the use of J2C. The Web Services Description Language (WSDL), with its extensions, allows the description of many different kinds of services: Web services, Java services, Enterprise Java Bean (EJB) services, Java Message Service (JMS) services, J2C services, etc. The Web Services Invocation Framework provides a common way of invoking each of these services. The WSIF supports a simple Java™ API for invoking Web services. Use of the WSIF API allows clients to invoke services focusing on an abstract service description, that is, the portion of WSDL that covers port types, operations and message exchanges without referring to real protocols.

As mentioned hereinbefore, WSDL is extensible to allow the description of many types of services other than web services. With WSIF, any of these types of services may be invoked in a common fashion. However, WSIF does not expose certain J2C properties, thus constraining certain applications.

SUMMARY OF THE INVENTION interactionSpec and connectionSpec properties are exposed as data in WSIF operations, thus WSIF support for J2C is made functionally more complete. Advantageously, exposing J2C interactionSpec and connectionSpec properties as data in a WSIF operation allows the connectionSpec and interactionSpec properties to be set dynamically on input and the interactionSpec properties to be retrieved dynamically on output.

In accordance with an aspect of the present invention there is provided a method of improving Web Services Invocation Framework support for Java 2 Enterprise Edition Java Connector Architecture comprising exposing properties of a given interface as data.

In accordance with another aspect of the present invention there is provided a method of a performing Web Services Invocation Framework operation. The method includes receiving an input message that includes a plurality of parts, determining whether any of the plurality of parts are instances of a property of a given interface and, if a given part of the plurality of parts is determined to be an instance of the property of the given interface, setting a value from the given part into the given interface, thereby exposing a property of the given interface as data. In other aspects of the present invention, a resource adapter is provided in an application sever, the resource adapter for performing this method and a computer readable medium is provided to allow a general purpose computer to perform this method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIGS. 3A-3R illustrate exemplary code for implementing WSIF Operation aspects of the present invention;

FIGS. 4A-4Q illustrate exemplary code for implementing WSIF Provider External Call Interface aspects of the present invention;

FIGS. 5A-5D illustrate exemplary code for implementing interactionSpec Property exposure aspects of the present invention;

FIGS. 6A-6D illustrate exemplary code for implementing ConnectionSpec Property exposure aspects of the present invention;

FIGS. 7A-7H illustrate exemplary code for implementing WSIF Provider Extension aspects of the present invention;

FIGS. 8A-8O illustrate exemplary code for implementing Streamable Message aspects of the present invention;

FIGS. 9A-9D illustrate exemplary code for implementing WSIF Binding Operation aspects of the present invention;

FIGS. 10A-10E illustrate an exemplary customer port type definition implementing aspects of the present invention;

FIGS. 11A-11I illustrate an exemplary binding definition implementing aspects of the present invention;

FIG. 12 illustrates an exemplary services definition implementing aspects of the present invention; and FIGS. 13A-13H illustrate exemplary client code implementing aspects of the present invention.

DESCRIPTION OF THE PREFERRED EMBODIMENT

Figure 1:
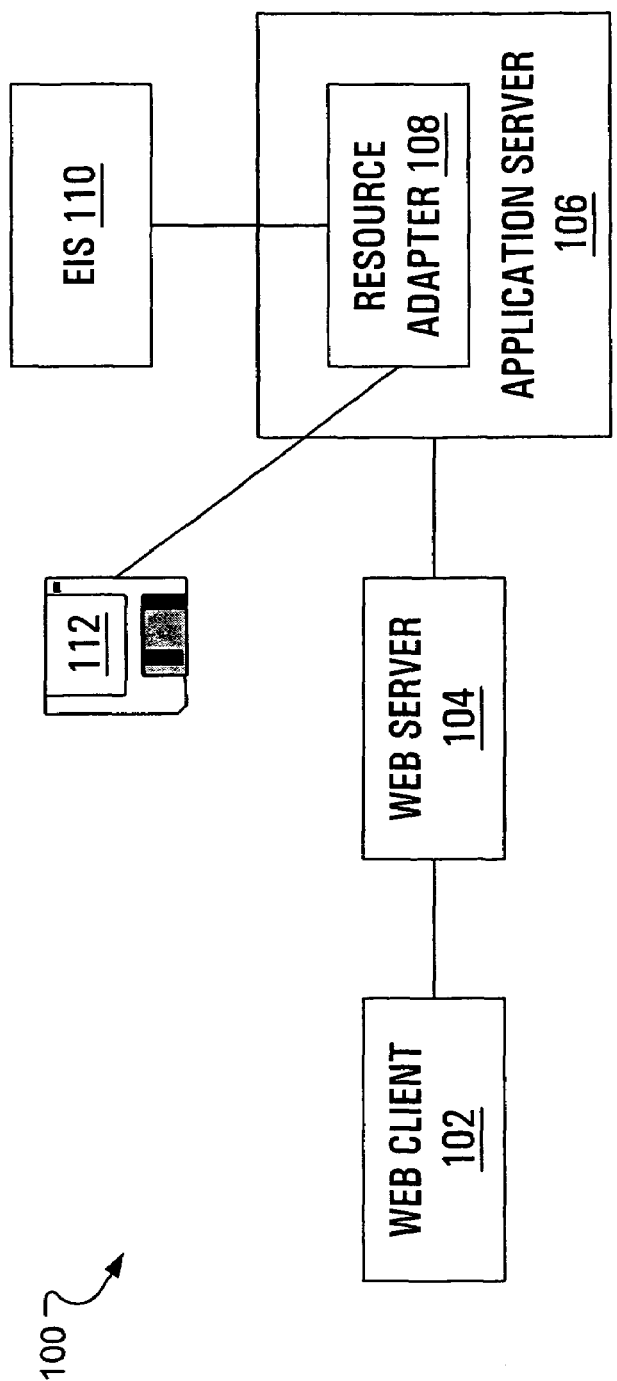
FIG. 1 illustrates an exemplary environment for implementation of aspects of the present invention.

FIG. 1 illustrates an exemplary environment for implementation of aspects of the present invention. In particular, a web client 102 is illustrated in communication with a web server 104. It should be understood that this connection will typically occur over a digital communications network. Where an end user at the web client is interested in a service provided by an EIS 110, such an interest can be indicated to the web server 104 and, in response to receiving such an indication, the web server 104 may contact an application server 106. It is then the task of the application server 106 to interact with the EIS 110 as directed by the end user.

As mentioned hereinbefore, J2C provides an environment so that the EIS 110 can provide a resource adapter 108 that can plug in to the application server 106 so that the application server 106 can generically provide the qualities of services available from the resource adapter 108 illustrated and other EIS-specific resource adapters (not shown).

The resource adapter 108 may be loaded with methods exemplary of this invention from a software medium 112 which could be a disk, a tape, a chip or a random access memory containing a file downloaded from a remote source.

Much of the following description of interactionSpec and connectionSpec and respective properties is drawn from the Java™ 2 Platform, Enterprise Edition, v 1.3 API Specification (hereby incorporated herein by reference).

The interactionSpec property holds properties for driving an interaction with an EIS instance. The CCI specification defines a set of standard properties for an interactionSpec. An interactionSpec implementation is not required to support a standard property if that property does not apply to its underlying EIS. The interactionSpec implementation class must provide getter and setter methods for each of its supported properties. The getter and setter methods convention should be based on the Java Beans design pattern. The standard properties are as follows:

FunctionName: name of an EIS function
InteractionVerb: mode of interaction with an EIS instance
ExecutionTimeout: the number of milliseconds an Interaction will wait for an EIS to execute the specified function
FetchSize
FetchDirection
MaxFieldSize
ResultSetType
ResultSetConcurrency The last five standard properties are used to give hints to an Interaction instance about the ResultSet requirements.

A CCI implementation can provide additional properties beyond that described in the interactionSpec interface. Note that the format and type of the additional properties is specific to an EIS and is outside the scope of the CCI specification.

ConnectionSpec is used by an application component to pass connection request-specific properties to an interface for getting connection to an EIS instance. The CCI specification defines a set of standard properties for a Connection-Spec. The properties are defined either on a derived interface or an implementation class of an empty ConnectionSpec interface. In addition, a resource adapter may define additional properties specific to its underlying EIS. A resource adapter is a system-level software driver that is used by a Java application to connect to an EIS. The resource adapter plugs into an application server and provides connectivity between the EIS, the application server and the enterprise application. In simpler terms, a resource adapter is the software that allows an application to access functions in an EIS.

Among others, the following standard properties are defined by the CCI specification for ConnectionSpec:

UserName: name of the user establishing a connection to an EIS instance
Password: password for the user establishing a connection interactionSpec and ConnectionSpec Properties generally need to be "exposed" to allow an application to set the values of the properties at execution time. Otherwise, the values of the properties would have to be set when the application is built.

Often the interactionSpec values may be preset. However, some scenarios require the ability to set a value or to obtain a value on output. For example, in "component managed signon", there is a requirement of the ability to set the user name and password on the connectionSpec on input. In contrast, for "container managed signon", a connectionSpec is not used.

ConnectionSpec properties are part of the port section of the WSDL. ConnectionSpec exposes any security information and connection parameters that are specific to the resource adapter. In the component managed signon case, an application component passes security information (example: username, password) through a ConnectionSpec instance. interactionSpec properties are part of the binding section of the WSDL.

It is known that J2C has a managed and a non-managed scenario. In the non-managed scenario the connectionSpec and interactionSpec properties are taken from an associated WSDL file. An interactionSpec object can also be exposed as a property on a proxy that is used to execute an EIS interaction.

In the managed scenario, some connectionSpec properties (UserName and Password) are exposed as an administered Java Authentication and Authorization Service (JAAS) Subject or as custom properties on an interface for getting connection to an EIS instance. interactionSpec properties are not exposed in the managed scenario.

Exposing connectionSpec properties is important for enabling component managed signon. Exposing interactionSpec properties is important because some EIS interactionSpec properties are important for the application to set or retrieve at runtime. Unfortunately, when working with WSIF J2C operations, the interactionSpec properties are part of the binding and are not exposed. A "binding" is a WSDL concept. A binding defines the concrete implementation of an abstract operation. The binding specifies the message format and protocol details of the abstract operation. In the context of a WSIF J2C operation, the binding is communicated to the resource adapter 108 in one or more messages.

Figure 2:
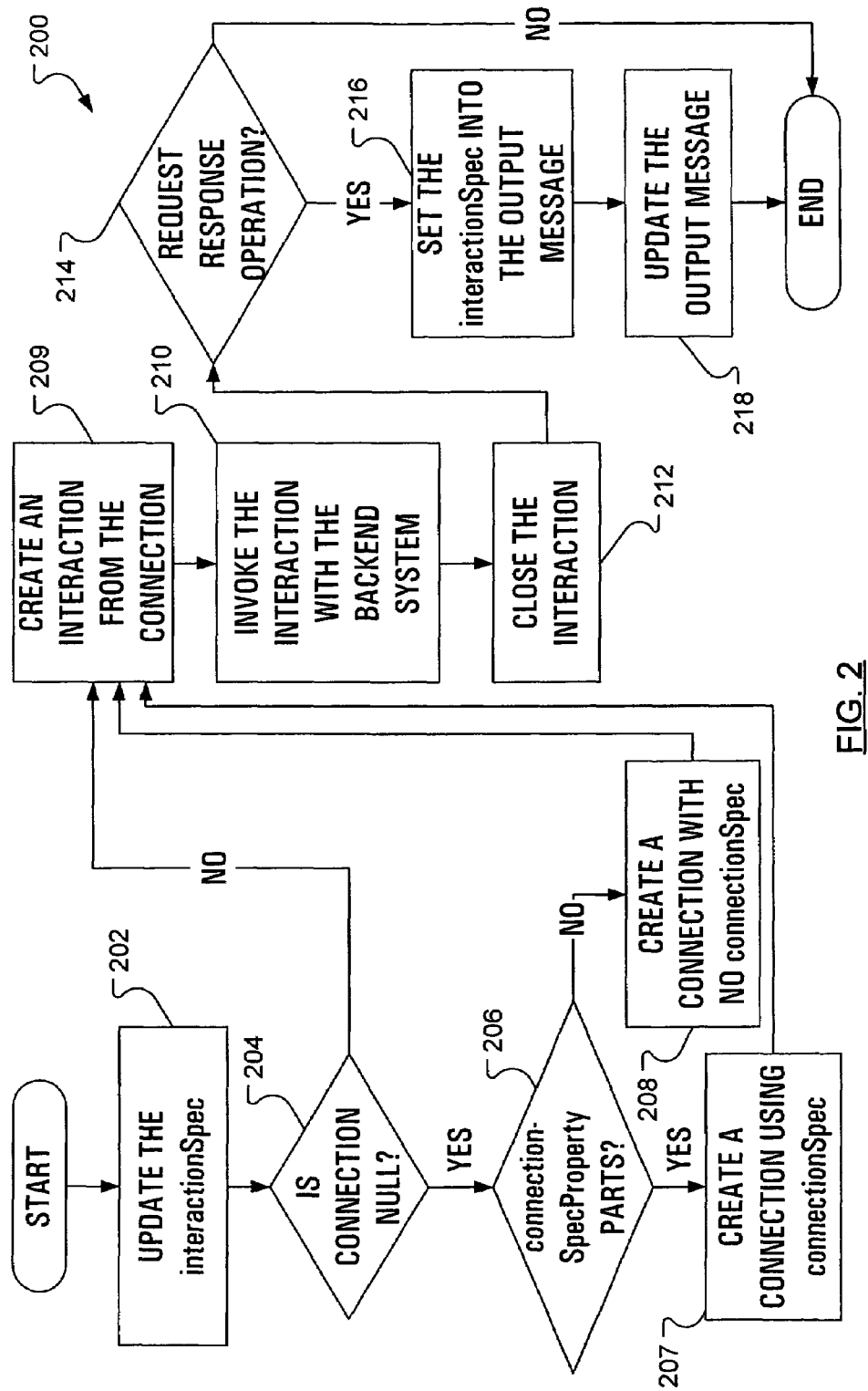
FIG. 2 illustrates steps of a method carried out by a resource adapter in the environment of FIG. 1 according to an embodiment of the present invention.

To implement the exposure of the interactionSpec properties and the connectionSpec properties as data, the method typically implemented by the resource adapter 108 is altered as illustrated in FIG. 2.

An input message is received by the resource adapter 108 from the application server 106, causing the resource adapter 108 to perform the steps of the method 200 illustrated in FIG. 2. The updateInteractionSpec method provided by the EIS 110 is initially called (step 202) to update the interactionSpec using data from the input message. The method called updateInteractionSpec determines whether any of the parts in the input message are instances of the interactionSpecProperty. If a part is determined to be such an instance, updateInteractionSpec takes the value from the part and sets the value into the interactionSpec. It is then determined whether a connection is currently available (step 204). Where a connection is not available, the connection is considered to be "null". If a connection is not currently available, it is determined whether any of the parts in the input message are instances of the connectionSpecProperty (step 206). If so, while creating a connection to the EIS 110 (step 207), values from each of such parts are set into the connectionSpec, which is then used when creating the connection. If no parts are instances of the connectionSpecProperty, a connection to the EIS 110 is created with no connectionSpec specified (step 208). In each of steps 207 and 208, the connection to the EIS 110 is created by calling a createConnection method. If a connection is determined (step 204) to be currently available, or once a connection has been created (step 207 or 208), an interaction (i.e., a javax.resource.cci.Interaction) is created from the connection (step 209). An interaction execute method is then invoked (step 210) with the EIS 110. The interaction is then closed (step 212). If the interaction execute method is an input only method, the method is complete. However, where the interaction execute method is a request response operation (determined in step 214), the interactionSpec is set into an output message (step 216) and the output message is updated (step 218) with specified interactionSpec properties.

Note that, in the port type section of the WSDL, the developer adds a part to the input message for each interactionSpec or connectionSpec property that is to be exposed as data. Parts are also added to the output message for each interactionSpec property that is to be exposed as data. In the binding section of the WSDL for the input and output sections of the operation, the developer then specifies how these added parts map to connectionSpec or interactionSpec properties. This mapping is then used at runtime.

As will be apparent to a person skilled in the art, the portion of the method 200 illustrated in FIG. 2 that is typically implemented by the resource adapter 108 is represented by step 209, step 210 and step 212.

Exemplary code operable to implement the method of FIG. 2 is illustrated in FIGS. 3A-3R as WSIFOperation_JCA.java.

The method called updateInteractionSpec that is used in WSIFOperation_JCA.java (see FIGS. 3D and 3F) and called at step 202 of FIG. 2, is provided as part of exemplary code illustrated in FIGS. 4A-4Q, called WSIFProvider_ECI.java (in particular, see FIG. 4G). The ECI acronym relates to the External Call Interface of the resource adapter 108. The method called updateinteractionSpec determines whether any of the parts in the input message are instances of the interactionSpecProperty. If a part is determined to be such an instance, updateInteractionSpec takes the value from the part and sets the value into the interactionSpec. The method called updateInteractionSpec calls ECIInteractionSpecProperty, which is illustrated in FIG. 5.

The method called createConnection that is used in WSIFOperation_JCA.java (see FIGS. 3E and 3G) and called at step 206 of FIG. 2 is also provided as part of WSIFProvider_ECI.java (see FIG. 4L). The method called createConnection determines whether any of the parts in the input message are instances of the connectionSpecProperty. If a part is determined to be such an instance, createConnection takes the value from the part, sets the value into the connectionSpec and uses the connectionSpec when creating the connection. If no parts are instances of the connectionSpecProperty, a connection is created with no connectionSpec specified. The method called createConnection calls ECIConnectionSpecProperty, which is illustrated in FIG. 6.

Additionally, a method called updateOutputMessage that is used in WSIFOperation_JCA.java (see FIG. 3E) and called at step 218 of FIG. 2 is provided as part of WSIFProvider_ECI.java (see FIG. 4K).

A known interface called WSIFProviderJCAExtensions has been updated as shown in FIG. 7. to include the updateInteractionSpec, updateOutputMessage and createConnection methods.

WSIFMessage_JCAStreamable, which is illustrated in FIG. 8, keeps the input interactionSpec and connectionSpec properties, which were provided as parts in the input message, from being sent as data to the EIS 110. WSIFMessage_JCAStreamable also populates the parts of the output message as appropriate from the interactionSpec.

WSIFBindingOperation_JCAProperty, which is illustrated in FIG. 9, is an interface of the methods used to get/set partName and either connectionSpec property name or interactionSpec property name.

Consider the use of an embodiment of the present invention in the following example. A message called "getCustomerRequest" is defined in Customer.wsdl (see FIGS. 10A-10E, in particular FIG. 10E). The message definition includes identification of particular parts, including "userid", "password" and "functionName". An operation called "getCustomer" is also defined in Customer.wsdl. The getcustomer message receives the specific getCustomerRequest message as input and issues a getCustomerResponse message as output.

The getcustomer operation is further defined in CustomerCICSECIBinding.wsdl (see FIGS. 11A-11I). By this further definition, the user name part and the password part are each defined as a ConnectionSpecProperty and the functionName part is defined as an InteractionSpecProperty. Thus, the user name part and the password part may be exposed on the ConnectionSpec as data and the functionName part may be exposed on the interactionSpec as data.

The definitions of exemplary definition files Customer.wsdl and CustomerCICSECIBinding.wsdl are imported into the exemplary definition file called CustomerCICSECIService.wsdl (FIG. 12). The acronym CICS refers to the "Customer Information Control System", which is a family of application servers and connectors that provides online transaction management and connectivity for applications.

Exemplary program code, CustomerProxy.java, is illustrated in FIGS. 13A-13H. Notably, CustomerProxy.java references the exemplary definition file called CustomerCICSECIService.wsdl (see FIG. 13D) and, by doing so, thus references exemplary definition files Customer.wsdl and CustomerCICSECIBinding.wsdl. The reference to these exemplary definition files allows the exemplary program code to make reference to the getCustomer operation and the getCustomerRequest and getCustomerResponse messages (see FIG. 13C).

As will be apparent to a person skilled in the art, exposing interactionSpec and ConnectionSpec properties as data allows the size of the commarea of a CICS external call interface to be specified, providing a performance enhancement (where a commarea is a "communications area", which defines the input and outputfor a program). Additionally, the exposing allows a user name and a password to be passed by a resource adapter when establishing a connection, thus supporting component managed signon.

Other modifications will be apparent to those skilled in the art and, therefore, the invention is defined in the claims.

We claim:

1. A method for exposing additional interactionSpec properties and additional connectionSpec properties in a message from a particular Enterprise Information/Integration System (EIS) as data at execution time, wherein a format and type of additional interactionSpec properties are specific to the particular EIS, and wherein the format and type of additional interactionSpec properties are outside of a scope of a Java Connector Architecture (J2C)-deflned Common Client Interface (CCI) between the particular EIS and an application server, the method comprising:

receiving, from the application server, an input message to a resource adapter;

in response to receiving the input message, calling an updatelnteractionSpec method provided by the EIS to update an interactionSpec object, wherein the updatelnteractionSpec method determines whether any parts in the input message are instances of an interactionSpecProperty, and wherein the interactionSpecProperty defines values for the additional interactionSpec properties of the interactionSpec object;

in response to determining that a part in the input message is an instance of the interactionSpec object, extracting a value from the part in the input message that is an instance of the interactionSpec object, and updating the interactionSpec object by setting the value into the interactionSpec object;

determining whether a connection is currently available between the EIS and the application server;

in response to determining that the connection between the EIS and the application server is not currently available, determining whether any of the parts in the input message are instances of a connectionSpecProperty, wherein the connectionSpecProperty includes values for the additional connectionSpec properties of a connectionSpec object;

setting the values from any determined connectionSpecProperty into the connectionSpec object to create the connection between the EIS and the application server;

creating an interaction between the EIS and the application server through the use of an interaction execute method;

in response to an interaction execute method being a request response operation, setting the interactionSpec object into an output message from the resource adapter; and updating the output message with values from the interactionSpecProperty.

2. A system comprising:

a resource adapter comprising execution logic for exposing additional interactionSpec properties and additional connectionSpec properties in a message from a particular Enterprise Information/Integration System (EIS) as data at execution time, wherein a format and type of additional interactionSpec properties are specific to the particular EIS, and wherein the format and type of additional interactionSpec properties are outside of a scope of a Java Connector Architecture (J2C)-defined Common Client Interface (CCD between the particular EIS and an application server, wherein the additional interactionSpec properties and additional connectionSpec properties are exposed by performing the steps of:

receiving, from the application server, an input message to a resource adapter;

in response to receiving the input message, calling an updatelnteractionSpec method provided by the EIS to update an interactionSpec object, wherein the updatelnteractionSpec method determines whether any parts in the input message are instances of an interactionSpecProperty, and wherein the interactionSpecProperty defines values for the additional interactionSpec properties of the interactionSpec object;

in response to determining that a part in the input message is an instance of the interactionSpec object, extracting a value from the part in the input message that is an instance of the interactionSpec object, and updating the interactionSpec object by setting the value into the interactionSpec object;

determining whether a connection is currently available between the EIS and the application server;

in response to determining that the connection between the EIS and the application server is not currently available, determining whether any of the parts in the input message are instances of a connectionSpecProperty, wherein the connectionSpecProperty includes values for the additional connectionSpec properties of a connectionSpec object;

setting the values from any determined connectionSpecProperty into the connectionSpec object to create the connection between the EIS and the application server;

creating an interaction between the EIS and the application server through the use of an interaction execute method;

in response to an interaction execute method being a request response operation, setting the interactionSpec object into an output message from the resource adapter; and updating the output message with values from the interactionSpecProperty.

3. A computer-readable medium encoded with a computer program, the computer program comprising computer executable instructions configured for exposing additional interactionSpec properties and additional connectionSpec properties in a message from a particular Enterprise Information/Integration System (EIS) as data at execution time, wherein a format and type of additional interactionSpec properties are specific to the particular EIS, and wherein the format and type of additional interactionSpec properties are outside of a scope of a Java Connector Architecture (J2C)-defined Common Client Interface (CCI) between the particular EIS and an application server, and wherein the computer executable instructions are configured for performing the steps of:

receiving, from the application server, an input message to a resource adapter;

bin response to receiving the input message, calling an updateInteractionSpec method provided by the EIS to update an interactionSpec object, wherein the updateInteractionSpec method determines whether any parts in the input message are instances of an interactionSpecProperty, and wherein the interactionSpecProperty defines values for the additional interactionSpec properties of the interactionSpec object;

in response to determining that a part in the input message is an instance of the interactionSpec object, extracting a value from the part in the input message that is an instance of the interactionSpec object, and updating the interactionSpec object by setting the value into the interactionSpec object;

determining whether a connection is currently available between the EIS and the application server;

in response to determining that the connection between the EIS and the application server is not currently available, determining whether any of the parts in the input message are instances of a connectionSpecProperty, wherein the connectionSpecProperty includes values for the additional connectionSpec properties of a connectionSpec object; and setting the values from any determined connectionSpecProperty into the connectionSpec object to create the connection between the EIS and the application server creating an interaction between the EIS and the application server through the use of an interaction execute method;

in response to an interaction execute method being a request response operation, setting the interactionSpec object into an output message from the resource adapter; and updating the output message with values from the interactionSpecProperty.

* * * * *